US006795640B1

(12) United States Patent
Honda

(10) Patent No.: US 6,795,640 B1
(45) Date of Patent: *Sep. 21, 2004

(54) DATA RECORDING DEVICE, DATA REPRODUCING DEVICE AND DATA RECORDING MEDIUM FOR MANAGING ENCODED DATA OVER A PLURALITY OF RECORDING MEDIA

(75) Inventor: Kazuyuki Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/637,809

(22) Filed: Aug. 11, 2000

Related U.S. Application Data

(63) Continuation of application No. 08/645,778, filed on May 14, 1996, now Pat. No. 6,141,489.

(30) Foreign Application Priority Data

May 15, 1995 (JP) .......................................... P07-138870

(51) Int. Cl.[7] ................................................. H04N 5/91
(52) U.S. Cl. ........................... 386/95; 386/125; 386/126
(58) Field of Search ............................. 386/46, 95, 111, 386/112, 124, 125, 126; 369/32, 53.18; 360/72.2

(56) References Cited

U.S. PATENT DOCUMENTS

| | | | |
|---|---|---|---|
| 4,870,515 A | * 9/1989 | Stokes | 360/72.2 |
| 4,977,455 A | 12/1990 | Young | 358/142 |
| 5,134,499 A | 7/1992 | Sata et al. | 358/342 |
| 5,216,552 A | 6/1993 | Dunlap et al. | 360/33.1 |
| 5,319,505 A | 6/1994 | Adachi | 360/72.2 |
| 5,384,674 A | 1/1995 | Nishida et al. | 360/72.2 |
| 5,469,308 A | 11/1995 | Hamoda et al. | 360/71 |
| 5,546,191 A | * 8/1996 | Hibi et al. | 386/95 |
| 5,619,338 A | 4/1997 | Nakai et al. | 386/70 |
| 5,636,200 A | 6/1997 | Taira et al. | 369/275.3 |
| 5,647,049 A | 7/1997 | Odaka et al. | 386/124 |
| 5,650,991 A | 7/1997 | Fujiie | 369/275.4 |
| 5,852,593 A | * 12/1998 | Ishida et al. | 369/53.18 |
| 6,141,489 A | * 10/2000 | Honda | 386/95 |

FOREIGN PATENT DOCUMENTS

EP          0570203 A2 * 11/1993

* cited by examiner

*Primary Examiner*—Huy Nguyen
(74) *Attorney, Agent, or Firm*—Bell, Boyd & Lloyd LLC

(57) ABSTRACT

A data recording device that can easily and reliably manage a plurality of recording media or information recording surfaces even when a data compression rate largely varies with the contents of the data and that can record, for example, mass image data by effectively preventing the picture quality of an image represented by the image data from being degraded. The data recording device records image data after securing a region according to the preliminarily estimated number of recording media or information recording surfaces at the time of recording image data by using a coding method, by which a data compression rate largely varies with the contents of data. Thereafter, the data recording device records management data used for managing the plurality of recording media or information recording surfaces, on which the coded data is recorded, on the management region according to a result of recording.

13 Claims, 15 Drawing Sheets

FIG. 2

A | VOLUME NAME

B | TIME LENGTH OF ENTIRE PROGRAM

C | TABLE VALIDNESS/INVALIDNESS FLAG

D

| TABLE NO | VOLUME NAME | FILE NAME | START TIME | FINISH TIME | TIME LENGTH | SUITABLE CHANGING TIME |
|---|---|---|---|---|---|---|
| 1 | | | | | | |
| 2 | | | | | | |
| 3 | | | | | | |
| ------ | ------ | ------ | ------ | ------ | ------ | ------ |
| n | | | | | | |
| n+1 | NULL | | | | | |

E

| FILE ENDING MARK | START TIME | TIME LENGTH | IMAGE DATA |
|---|---|---|---|

DATA RECORDING DEVICE, DATA REPRODUCING DEVICE AND DATA RECORDING MEDIUM FOR MANAGING ENCODED DATA OVER A PLURALITY OF RECORDING MEDIA

CROSS-REFERENCE TO RELATED APPLICATIONS

This application is a continuation of application Ser. No. 08/645,778 filed May 14, 1996 U.S. Pat. No. 6,141,489.

BACKGROUND OF THE INVENTION

1. Field of the Invention

The present invention generally relates to a data recording device, a data reproducing and a data recording medium. More particularly, the present invention relates to techniques for easily and reliably managing a plurality of recording media or the like, on which divided image data are respectively recorded, even in the case that data compression rate largely varies with the contents of the data, and for recording mass image data, whose picture quality is effectively prevented from being degraded, by recording image data after securing a region according to the preliminarily estimated number of recording media or information recording surfaces at the time of recording image data by using, for example, MPEG (Moving Picture Experts Group) system, and by recording management data on this region according to the recorded image data.

2. Description of the Related Art

Hitherto, in the case of recording image data on an optical disk or the like, the image data is encoded before recorded. Further, a coding method using MPEG has been proposed as this technique for encoding image data.

Namely, this MPEG system first performs a discrete cosine transform (DCT) on image data prescribed by a predetermined color difference format (for instance, 4:2:2) in DCT blocks. Thereafter, this MPEG system encodes the image data sequentially by utilizing the correlation between coefficient data obtained as a result of the DCT and by transforming one or more coefficient data into a single variable-length code. At that time, MPEG system assigns a variable-length code, whose data length varies with the frequency (or incidence) of the coefficient data, to the image data. Thereby, the data compression rate is greatly enhanced in comparison with conventional coding systems. Consequently, the image data (namely, the coefficient data) can be efficiently transmitted.

Further, MPEG system is defined in such a manner that before such a process, the quantity of data is reduced by effectively utilizing the correlation between consecutive image data through inter-frame coding and intra-frame coding performed thereon. Thereby, the data compression rate can be further enhanced.

Namely, this DCT block consists of image data of 8×8 pixels. Further, MPEG system performs the coding in DCT blocks. Moreover, a macroblock is defined as being composed of four DCT blocks represented by luminance signals (namely, four DCT blocks, each of which consists of image data of 8×8 pixels represented by luminance signals) and DCT blocks represented by color difference signals corresponding to the four DCT blocks represented by luminance signals. Furthermore, in MPEG system, a slice is defined as a set of macroblocks. Additionally, a GOP (namely, Group Of Pictures) is defined as a set of the slices. Besides, a sequence corresponding to image data, which represent (a sheet of) an image, is defined as a set of GOPs.

Thus, in MPEG system, data structure is defined as a hierarchial structure having six layers, namely, a sequence layer consisting of sequences, a GOP layer consisting of GOPs (Group Of Pictures), a picture layer consisting of pictures, a slice layer consisting of slices, a macroblock layer consisting of macroblocks and a block layer consisting of blocks, which are serially arranged in descending order. Among these layers, the sequence layer and the GOP layer of high orders are determined as illustrated in FIG. 15(A) and 15(B).

Namely, the sequence layer corresponds to image data of a sheet of an image. In the case of recording image data on an optical disk of such a type, MPEG system performs a sequence control operation in such a way that information of this sequence layer is continuously allocated (or located). First, a sequence header code (SHC) designating the beginning of the sequence layer is allocated. Next, information of the sequence layer, which represents the number of pixels of an image and the aspect ratio thereof and so on, is continuously allocated as illustrated in FIG. 15(A). Subsequently, information of GOP layer (of the sequence layer) is iteratively allocated a predetermined number of times. Then, such information is followed by other information of the sequence layer, namely, SEC (Sequence End Code) is allocated.

Further, regarding GOP layer, this layer is the smallest unit of a screen (or scene) group which is a unit to be accessed randomly. First, GSC (Group Start Code) representing the beginning of GOP is allocated. Then, TC (Time Code) representing a time period having passed since the beginning of the sequence is further allocated. Subsequently, information concerning predetermined flags or the like is allocated. Thereafter, information of the picture layer is allocated iteratively. Thus, GOP layer is formed as illustrated in FIG. 15(B).

Moreover, as to the picture layer, after SHC and information concerning a motion vector or the like are serially allocated, information of the slice layer is iteratively allocated a predetermined number of times. Thus the picture layer is formed. Similarly, the slice layer is formed by after SHC and so forth are allocated. Furthermore, in the case of the macroblock layer, necessary information is allocated in DCT blocks, and a variable-length code as previously described is repeated as the DCT block.

Additionally, the inter-frame coding and the intra-frame coding are distinguished from each other according to a closed GOP flag, which is allocated subsequent to a time code TC in the GOP layer and indicating whether or not GOP is reproduced independently of other GOPs. MPEG standard defines two types of pictures obtained by performing the inter-frame coding, namely, P-Pictures (Predictive Pictures), on which the inter-frame coding is performed with respect to previously transmitted image data, and B-Pictures (Bidirectionally predictive Pictures), on which the inter-frame coding is performed with respect to both of precedent and subsequent image data.

Meanwhile, in the case of MPEG transform algorithm, when performing the variable-length coding on coefficient data, the variable-length coding is conducted after the quantization of this coefficient data is carried out according to a predetermined quantization table. Incidentally, the data compression rate can be changed by switching this quantization table to another quantization table.

Thereby, even in the case that it is difficult to record a single program on a single optical disk by performing an ordinary process, MPEG system can record mass image data on this single optical disk by changing the quantization table to another quantization table employing a coarse quantization size. However, when enhancing the data compression rate in this way, there is caused a problem that the picture quality is degraded.

As a method for solving such a problem, there has been contrived, for example, a method of splitting (namely, dividing) and recording a program across a plurality of optical disks, when it is difficult to record a single program on a single optical disk. However, in the case that a single program is split (and recorded) across a plurality of optical disks, respectively, there is caused a problem that the management of the plurality of optical disks is troublesome in a playback (or reproduction) unit. Further, there is the fear that special playbacks such as a random access playback becomes difficult.

Especially, the coding systems such as MPEG system have characteristics that the final quantity of whole data varies largely according to picture properties as a result of performing the inter-frame coding, by which the quantity of data is reduced by utilizing the correlation between image data, and performing DCT process and the variable-length coding. Therefore, even when starting the recording by preliminarily intending to record image data on a plurality of optical disks, the number of optical disks, on which image data is actually recorded, is sometimes different from the estimated number of optical disks. Consequently, there is a problem that it is difficult to preliminarily prepare management data for managing the plurality of optical disks.

Further, when using the coding systems such as MPEG system, in the case of simply splitting and recording a program at a predetermined time across a plurality of optical disks by iteratively performing the inter-frame coding and the intra-frame coding, there is the fear that immediately after changing one of the optical disks to another thereof, the image cannot be reproduced.

The present invention is accomplished in view of the aforementioned problems.

It is, accordingly, an object of the present invention to propose a data recording device, a data playback (or reproducing) device and a data recording medium, by which mass data representing images can be recorded and reproduced easily and reliably by effectively preventing the picture quality from being degraded, at the time of recording image data by using, for example, MPEG system.

SUMMARY OF THE INVENTION

To achieve the foregoing object, in accordance with an aspect of the present invention, there is provided a data recording device that comprises: coding means for coding data, which is sequentially inputted, according to a predetermined coding method and for outputting coded data (namely, data in the form of codes); and recording means for recording the coded data on a predetermined recording medium. In this data recording device, the recording means records the coded data after securing a management region corresponding to the number of recording media or information recording surfaces, which is preliminarily estimated, at a location where the recording of coded-data is started, when predicting that it is difficult to record the coded data on a recording medium or an information recording surface. Further, the recording means records management data used for managing a plurality of recording media or information recording surfaces, on which the coded data is recorded, on the management region according to a result of recording.

In the case that data serially inputted is encoded according to a predetermined coding method, the quantity of coded data cannot be always estimated preliminarily and accurately when a certain method is used as the coding method. Moreover, when using some recording medium, the exact capacity thereof cannot be known. Thus, correct management data can be recorded at (namely, just prior to) the leading location of the coded data in the case that the coded data is recorded after securing a management region corresponding to the number of recording media or information recording surfaces, which is preliminarily estimated, at a location where the recording of coded-data is started, when predicting that it is difficult to record the coded data on a recording medium or an information recording surface, and that management data used for managing a plurality of recording media (or recording portions of the recording medium) or information recording surfaces, on which the coded data is recorded, is recorded on the management region according to a result of recording. Further, when reproducing, the plurality of recording media (or recording portions of the recording medium) and information recording surfaces can be managed correctly on the basis of this management data.

In the case of a practical embodiment of this data recording device of the present invention, the data is image data. Further, the coding method is a method of allocating or assigning a variable-length code to one or more coefficient data, which are obtained by performing an orthogonal transform on the image data, according to the values of the coefficient data. Moreover, this recording medium is an optical disk.

Thus, especially, in the case that the data is image data and that the coding method is a method of allocating or assigning a variable-length code to one or more coefficient data, which are obtained by performing an orthogonal transform on the image data, according to the values of the coefficient data, the quantity of the coded data varies with the contents of the image data largely. Consequently, the management data can be effectively utilized by applying this to a recording medium, such as an optical disk, which can be accessed randomly.

Further, to achieve the foregoing object, in accordance with another aspect of the present invention, there is provided a data reproducing device for reproducing from a predetermined recording medium data coded by performing a predetermined coding process, which comprises: reproducing means for reproducing the coded data from the recording medium; and decoding means for decoding the coded data and for outputting decoded data. In this data reproducing device, the reproducing means reproduces the coded data by accessing a plurality of recording media, on which the coded data is recorded, or a plurality of information recording surface, on which the coded data is recorded, according to management data recorded on a leading area of the recording medium.

Namely, in the case of such a data reproducing device for reproducing from a predetermined recording medium data coded by performing a predetermined coding process, the coded data is reproduced by accessing a plurality of recording media, on which the coded data is recorded, or a plurality of information recording surface, on which the coded data is recorded, according to management data recorded on a leading area of the recording medium. Thereby, for example, the random access process can be facilitated.

Moreover, in the case of a practical embodiment of this data reproducing device of the present invention, the data, which is obtained by the decoding means by performing the decoding and is further outputted therefrom, is image data.

Furthermore, the coding method is a method of allocating or assigning a variable-length code to one or more coefficient data, which are obtained by performing an orthogonal transform on the image data, according to the values of the coefficient data. Additionally, this recording medium is an optical disk.

Besides, to achieve the foregoing object, in accordance with still another aspect of the present invention, there is provided a recording medium on which coded data obtained by encoding predetermined data according to a predetermined coding method is recorded. A sequence of coded data is split across and is recorded in such a manner as to extend over a plurality of recording sub-media or on a plurality of information recording surfaces of the recording medium. Moreover, management data used for managing the plurality of recording sub-media or the plurality of information recording surfaces thereof is recorded at least on a leading data recording area of the recording sub-medium, on which a leading part of the coded data is recorded.

Thus, when reproducing, the plurality of recording media or information recording surfaces can be managed by using this management data, if the management data used for managing the plurality of recording sub-media or information recording surfaces is recorded at least on a leading data recording area of the leading recording sub-medium when predetermined data is split across and are recorded in such a way as to extend over the plurality of recording sub-media or information recording surfaces.

Furthermore, in the case of a practical embodiment of such a recording medium of the present invention, the management data is recorded on the leading recording sub-med according to a result of recording the coded data thereon after securing a management region corresponding to the number of recording sub-media or information recording surfaces, which is preliminarily estimated, when predicting that it is difficult to record the coded data on a recording sub-medium or an information recording surface. Further, management data used for managing a plurality of recording sub-media or information recording surfaces, on which the coded data is recorded, is recorded on the management region according to a result of recording.

Thus, the plurality of recording sub-media or information recording surfaces can be managed correctly if the recording means records management data is recorded, on the management region according to a result of recording after securing a management region corresponding to the number of recording sub-media or information recording surfaces, which is preliminarily estimated, when predicting that it is difficult to record the coded data on a recording sub-medium or an information recording surface.

Additionally, in the case of an example of this practical embodiment of the recording medium of the present invention, the predetermined data is image data. Further, the coding method is a method of allocating or assigning a variable-length code to one or more coefficient data, which are obtained by performing an orthogonal transform on the image data, according to the values of the coefficient data. Furthermore, the recording medium is an optical disk.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 2(A) to 2(E) are diagrams for illustrating a table and so on recorded by the image data processor of FIG.

DETAILED DESCRIPTION OF THE PREFERRED EMBODIMENTS

Hereinafter, the preferred embodiments of the present invention will be described in detail by referring to the accompanying drawings.

(1) Recording of Image Data

Figure 1:
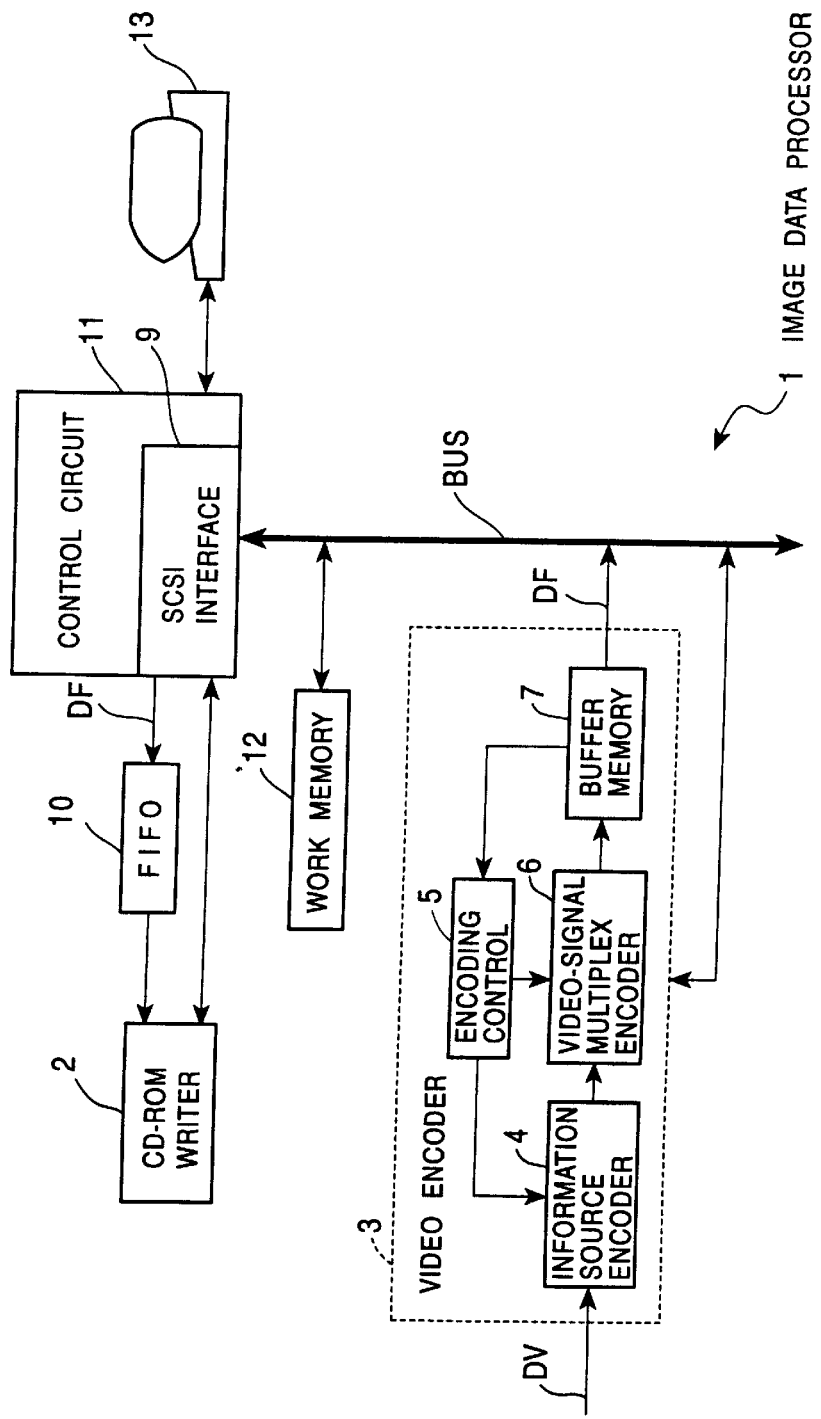
FIG. 1 is a schematic block diagram for illustrating the configuration of an embodiment of the present invention, namely, an image data processor for recording image data, which embodies the present invention.

FIG. 1 illustrates the configuration of an embodiment of the present invention, namely, an image data processor 1 for recording image data, which embodies the present invention. For instance, digital video signals DV of NTSC (National Television System Committee) type inputted from a digital video tape recorder are recorded on a writable (or rewritable) CD-ROM (namely, a CD-R (CD-Recordable)) loaded in what is called a CD-ROM writing unit (namely, a writable CD-ROM drive or a CD-R drive) 2.

Namely, in this image data processor 1, a video encoder 3 is operative to change an operation thereof in response to a control command inputted through a bus BUS in such a manner as to encode the digital video signals DV, which are serially inputted, in accordance with MPEG standard and output coded data DF together with a motion vector and so on to the bus BUS.

Thus, in the video encoder 3, an information source encoder 4 converts the digital video signal DV into a signal of what is called the 4:4:2 system (or color difference format). Thereafter, the information source encoder 4 outputs image data corresponding to the digital video signal DV to the subsequent vide signal multiplexing encoder 6 in a predetermined order corresponding to the coding of P-Picture and B-Picture in DCT blocks, each of which consists of 8×8 pixels, under the control of an encoding control (device) 5.

The video-signal multiplexing encoder 6 first performs operations, such as motion compensation, on image data inputted from this information-source encoder 4, under the control of the encoding control 5. Then, the encoder 6 performs DCT on resultant data. Subsequently, the encoder 6 quantizes coefficient data obtained as a result of DCT. Furthermore, the video-signal multiplexing encoder 6 allocates or assigns a variable-length code to one or more coefficient data according to the values of the quantized coefficient data. Then, the encoder 6 outputs resultant coded data DF through a buffer memory 7.

The encoding control 5 changes the operation of the entire video encoder 3 in response to a command inputted from the bus BUS. Then, the encoder 3 outputs information concerning a format, a time code, a quantization size and so forth, which is necessary for decoding MPEG data, to the bus BUS. Further, during this control operation, the encoding control 5 controls operations of the information source encoder 4 and the video-signal multiplexing encoder 6 simultaneously with the monitoring of the quantity of the coded data DF. Thereby, the encoding control 5 changes the quantization size and so on for the video-signal multiplexing encoder 6 as the need arises. Thus, an overflow or the like is effectively prevented from occurring in the buffer memory 7. Consequently, the video encoder encodes the digital video signal DV according to MPEG coding system and outputs signals representing coded data.

The CD-ROM writing unit 2 changes an operation thereof in response to a control command inputted through SCSI (Small Computer System Interface) interface 9. Further, the unit 2 records the coded data DF and so forth, which are inputted through SCSI interface 9, on a writable CD-ROM sequentially. Thereby, in the case of this embodiment, after the digital video signal DV is coded by the video encoder 3, coded data is transferred together with the various information to the CD-ROM writing unit 2, whereupon the coded data and the information are recorded on to the writable CD-ROM.

At that time, this CD-ROM writing unit 2 allocates a time code representing time information inputted from SCSI interface 9 to a sub-code according to the predetermined format and records the time code on CD-ROM. Thereby, the time management (or control) of a program recorded on CD-ROM can be achieved.

When writing, the CD-ROM writing unit 2 detects position information, which represents a writing position, from the writable CD-ROM. Thus, the unit 2 outputs the (writing) position information to a control circuit 11 through SCSI interface 9. Moreover, the CD-ROM writing unit 2 reproduces recordable information concerning time, the volume of CD-ROM and so forth from TOC (Table Of Contents) section preliminarily formed in a lead-in area of the CD-ROM and further outputs the reproduced information to the control circuit 11. Thereby, in the case of this embodiment, the recordable capacity of CD-ROM can be monitored in the control circuit 11.

Figure 15A:
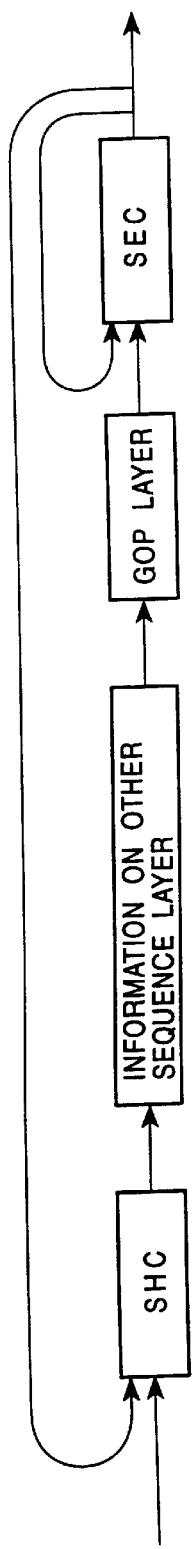
FIGS. 15(A) and 15(B) are schematic diagrams for illustrating the data structure employed in MPEG system.
Figure 15B:
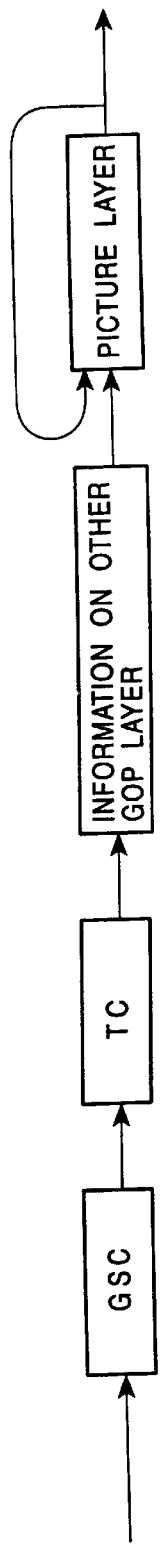

The control circuit 11 is constituted by a microcomputer which controls an operation of the entire image data processor 1. Further, the control circuit 11 controls a digital video tape recorder connected to the video encoder 3 by securing a work area in a work memory 12 and performing a predetermined procedure. Moreover, the circuit 11 outputs data such as coded data DF and coding control data, which are to be outputted to the bus BUS, to FIFO (First-In First-Out) memory 10 in a predetermined order. Thereby, the image data are serially recorded on CD-ROM by using the aforementioned data structure as illustrated in FIGS. 15(A) and 15(B).

During a writing operation, the control circuit 11 carries out a man-machine interface process through an input/output unit 13 consisting of a keyboard, a mouse and a display. Thus, information such as the time information (namely, the time code) concerning image data to be recorded on CD-ROM is displayed.

Moreover, during performing the writing operation, the control circuit 11 monitors the remaining recordable (namely, available) capacity of CD-ROM. When the quantity of data represented by a digital video signal DV, which is outputted from the digital video tape recorder, exceeds the capacity of single CD-ROM and it is difficult to record this digital video signal DV on single CD-ROM, this digital video signal DV is split across and is recorded in such a manner as to extend over a plurality of CD-ROMs.

At that time, in the case where it is predicted on the basis of data concerning a recording operation, which is preliminarily inputted by an operator through the input/output unit 13, that the recording of the digital video signal DV on single CD-ROM is difficult, the control circuit 11 records image data serially inputted in a predetermined format according to such a prediction.

Namely, the control circuit 11 receives data, which represent the title (or name) of a program, the recording time length thereof and a time code indicating a recording start time, from the input/output unit 13 and further stores these data in the work memory 12. Moreover, the control circuit 11 judges from the time length of a program to be actually recorded and the standard recording time of a program, which can be recorded on single CD-ROM, whether or not it is difficult to record the digital video signal DV on single CD-ROM. In the case where the control circuit 11 judges that it is difficult to record the signal DV on single CD-ROM, the circuit 11 calculates or estimates the number of necessary CD-ROMs.

In passing, if the time length of the entire program is 55 minutes and the standard recording time of a program which can be recorded on single CD-ROM is 20 minutes, the control circuit 11 judges that it is difficult to record the digital video signal DV on single CD-ROM. Further, the circuit 11 estimates the number of CD-ROMs, which are required to record the digital video signal DV, at three.

Referring now to FIGS. 2(A) to 2(E) and 3(A) to 3(F), there is shown the structure of data to be recorded on CD-ROMs on which image data divided into a plurality of parts are recorded. FIGS. 2(A) to 2(E) illustrate the structure of data to be recorded on a leading (or the first) CD-ROM. Further, FIGS. 3(A) to 3(F) illustrate the structure of data to be recorded on the remaining CD-ROMs (namely, the second CD-ROM or later).

Namely, when predicting that it is difficult to record the digital video signal DV on single CD-ROM, the volume name of the leading CD-ROM is recorded in an area subsequent to the lead-in area thereof as shown in FIG. 2(A). Subsequently, the time length of the entire program is recorded as shown in FIG. 2(B). Then, the table validness/invalidness flag is recorded (see FIG. 2(C)). Next, a table for managing a plurality of CD-ROMs is recorded (see FIG. 2(D)).

Further, the "volume name", "file name", "start time", "finish time", "time length" and "suitable changing time" of each of CD-ROMs of the preliminarily estimated number are recorded in this table. Here, the "volume name" is a name for designating and managing (or supervising) each CD-ROM. For example, names such as VOL1, VOL2, VOL3, . . . are serially assigned by the control circuit 11 to CD-ROMs from the leading or first one thereof in response to inputting operations performed by an operator. Further, the "file name" is a name for designating a program recorded on each CD-ROM. For instance, names such as PROGRAM1, PROGRAM2, PROGRAM3, . . . are serially assigned by the control circuit 11 to CD-ROMs from the leading or first one thereof in response to inputting operations performed by the operator.

Moreover, the "start time" and the "finish time" designate those of a program recorded on each CD-ROM, respectively, and are represented in terms of an accumulation time since the start time, at which the recording of data on the leading CD-ROM is started, and are recorded in the format of the time code in hours, minutes, seconds and frames. Furthermore, the "time length" designates a recording time, during which image data is recorded on each CD-ROM, and is similarly recorded in the format of the time code. In addition, the "suitable changing time" designates a time or moment, at which an object to be reproduced is switched from the program recorded on one of CD-ROMs to that recorded on another thereof (namely, the next CD-ROM) in the case of managing the reproducing of programs recorded on CD-ROMs, and are recorded in the format similar to those used in the case of recording the "start time" and the "finish time".

Further, in this table, NULL (namely, 0 in hexadecimal representation) is recorded as the volume name of the last CD-ROM in addition to the "start time" corresponding to each CD-ROM. This means that the program finishes at a file recorded immediately before this NULL.

Subsequently to this table, actual image data is recorded in the file format on the leading CD-ROM (as shown in FIG. 2(E)). At the beginning of this file, the "ending mark", the "start time" and the "time length" are recorded. Further, these data are followed by the actual image data. Here, note that this "ending mark" is flag indicating whether or not the corresponding CD-ROM is the last CD-ROM. In the case that the corresponding CD-ROM is the last one, the ending mark is set at the value of 0 in hexadecimal representation. In contrast, in the case where there is another CD-ROM subsequent to the CD-ROM corresponding to this "ending mark", the ending mark is set at the value of 1 in hexadecimal representation. Differently from this, the same start time and the same time length as recorded in the table are recorded in this file.

Figure 3:
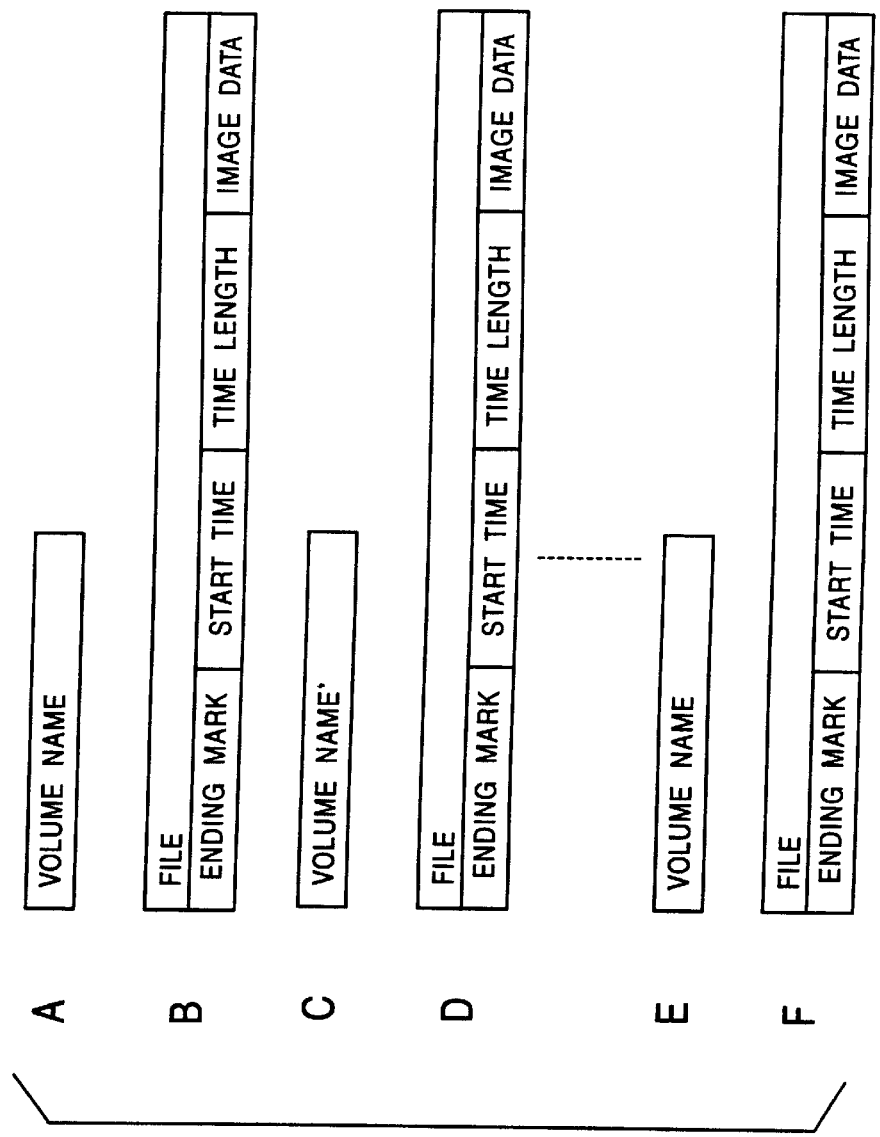
FIGS. 3(A) to 3(F) are diagrams for illustrating files and so forth recorded by the image data processor of FIG. 1.

In contrast, in the case of the subsequent CD-ROM, the volume name thereof is recorded in an area subsequent to the lead-in area thereof (see FIGS. 3(A), 3(C) and 3(E)). Subsequently, actual image data is recorded in the file format (see FIGS. 3(B), 3(D) and 3(F)). Incidentally, this volume name corresponds to the volume name recorded on the aforementioned table. Further, each file is created by recording the actual image data on this CD-ROM after the ending mark, the start time, the time length are recorded, similarly as in the case of the leading CD-ROM.

Thereby, in the case of the image data processor 1, when data represented by the digital video signal is split across and is recorded in such a manner as to extend over a plurality of CD-ROMs, respectively, management data for managing the plurality of CD-ROMs is recorded on the leading area of the leading CD-ROM. Further, when reproducing the data, the plurality of CD-ROMs can be easily accessed by using this management data.

Therefore, in the case of this embodiment, such mass image data can be recorded in such a manner as to extend over a plurality of CD-ROMs by dividing the image data into parts thereof respectively corresponding thereto, without excessively enhancing a data compression rate and forcibly recording the mass image data on single CD-ROM. Further, the data respectively recorded on the plurality of CD-ROMs can be reproduced on the basis of such management data easily and reliably. Consequently, the mass image data can be recorded and reproduced by effectively preventing the picture quality from being degraded.

Practically, in addition to the aforementioned information and data, information required to access each file, for example, the position information concerning the location on each CD-ROM is also recorded thereon. Thereby, each file recorded thereon can be further easily accessed.

In the case that image data and so forth are recorded on CD-ROMs in sequence, the control circuit 11 records the image data thereon after regions required to record the table and so on are preliminarily secured on CD-ROMs. Then, the tables are recorded on CD-ROMs on the basis of recording the image data. Moreover, the ending mark and so forth are recorded at the leading region of each CD-ROM.

Figure 4:
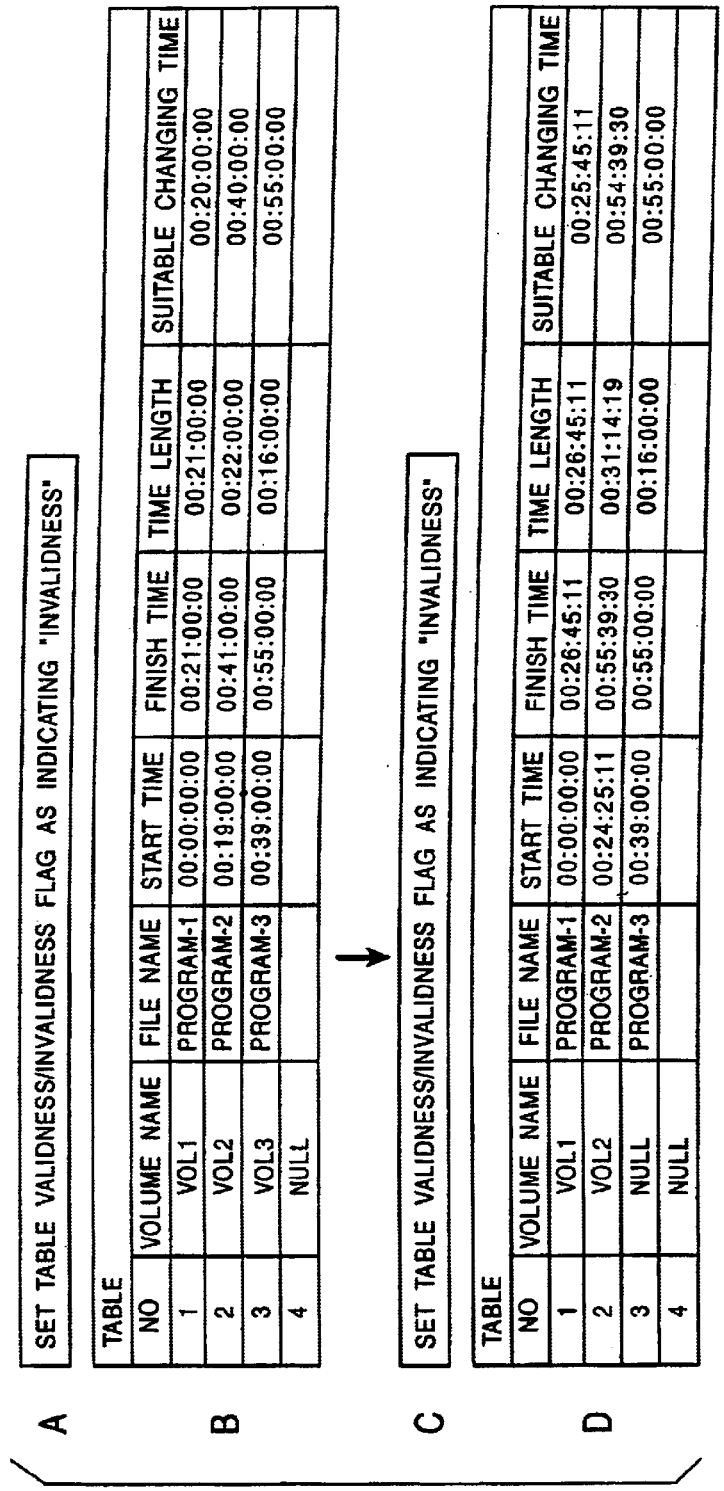
FIGS. 4(A) to 4(D) are diagrams for illustrating records of FIG. 2.

Namely, as illustrated in FIGS. 4(A) to 4(D), on the leading CD-ROM, the control circuit 11 records sets the validness/invalidness flag at the value designating the "invalidness" (see FIG. 4(A)) after the volume name and the time length of the entire program are recorded. Subsequently, the control circuit 11 records a file after recording the tables of the number which is equal to the preliminarily estimated number of necessary CD-ROMs. At that time, the control circuit 11 records a value, which is estimated from the standard recording time required to record data on single CD-ROM to the limit to the available part of the capacity thereof, as the start time in this table. Further, the file names and so forth of the number being equal to the estimated number of necessary CD-ROMs are recorded (see FIG. 4(B)).

Figure 5:
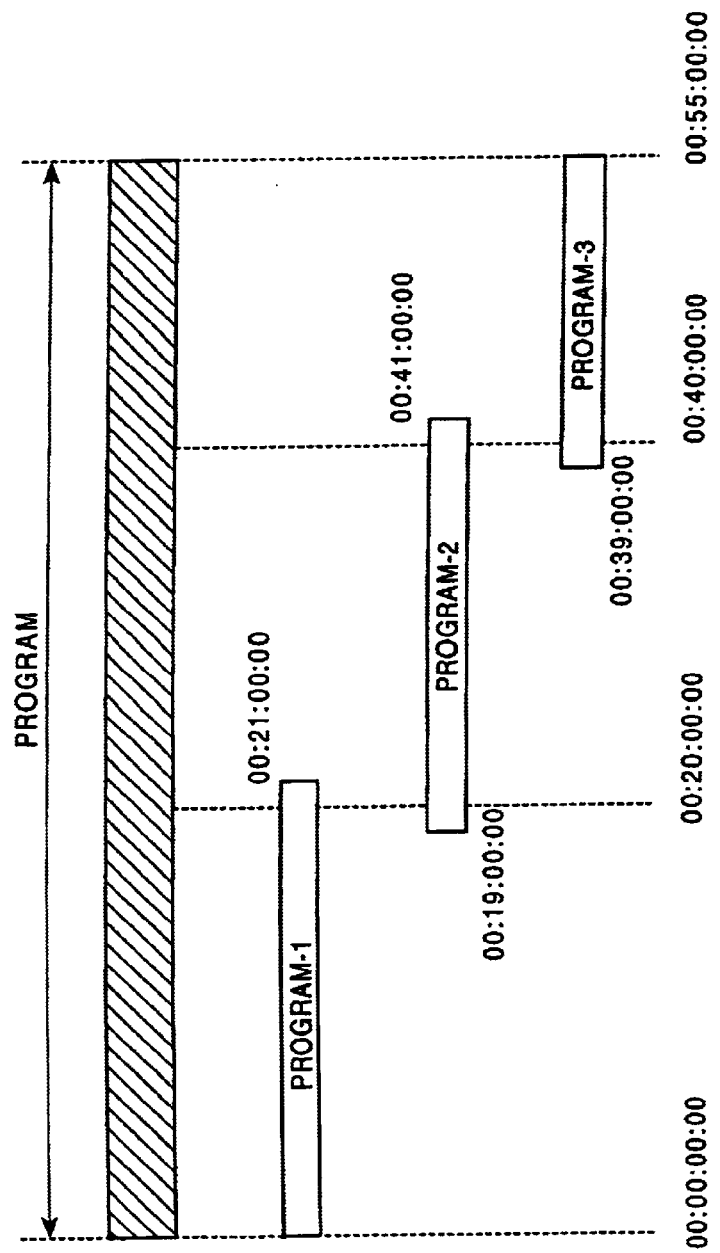
FIG. 5 is a schematic diagram for illustrating the recording and estimating of image data.

Thus, as illustrated in FIG. 5, the control circuit 11 records the preliminarily estimated value on the leading CD-ROM correspondingly to a program to be recorded and further secures the region having the capacity predicted as required to build the table thereon. Upon securing the region in this way, the control circuit 11 builds the table of the same structure in the work memory 12. Thereafter, the control circuit 11 starts recording the digital video signal DV, simultaneously with the monitoring of the remaining available capacity of this CD-ROM.

When it becomes difficult to write the image data to CD-ROM loaded in the CD-ROM writing unit 2 during being in such a state, the control circuit 11 records the subsequent image data to CD-ROM loaded by an operator in the CD-ROM writing unit 2. Further, the circuit 11 splits the data represented by the digital video signal DV across (namely, records this data in such a manner as to extend over the plurality of CD-ROMs).

Figure 6:
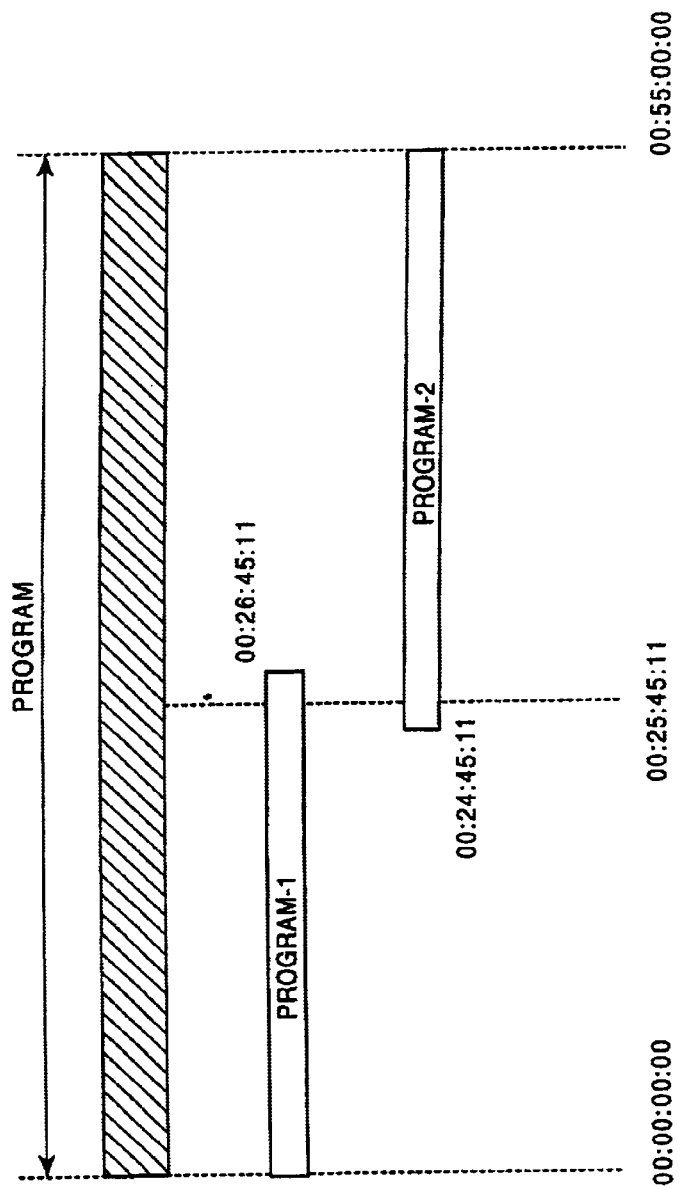
FIG. 6 is a schematic diagram for illustrating the recording of actual image data correspondingly to FIG. 5.

When performing such recording, the control circuit 11 updates the contents of the table created in the work memory 12 serially according to the start time, the finish time and the time length of (the recording of) the digital video signal DV recorded on each CD-ROM. Further, at that time, in the case that the program is completely recorded on two CD-ROMs, as illustrated in FIG. 6 correspondingly to FIG. 5, in spite of the prediction that three CD-ROMs are necessary, the circuit 11 records NULL as the volume name of the third CD-ROM (see FIG. 4(D)) but maintains the initially estimated value of the start time and so forth.

In contrast, in the case where CD-ROMs of the number larger than that initially estimated are required to record the digital video signal DV, the control circuit 11 changes the last recorded NULL into the actual volume name of CD-ROM. Moreover, the circuit 11 updates the corresponding file name and start time and so on.

Furthermore, when finishing the program and completing the table, the control circuit 11 updates the contents of the table in the first or leading CD-ROM by using the table created in this work memory 12. At that time, the control circuit 11 further updates the table validness/invalidness flag. When the program is completely recorded on CD-ROMs of the number which is not more than that preliminarily estimated, the control circuit 11 effectively sets this flag. Conversely, when the program is completely recorded on CD-ROMs of the number exceeding the number preliminarily estimated, the control circuit 11 sets this flag as a size exceeding flag. Incidentally, when the value of the table validness/invalidness flag is 0, this flag indicates the invalidness of the table. Further, if this flag has a value of 1, this flag indicates the validness thereof. Moreover, if this flag has value of 2, this flag acts as the size exceeding flag.

Thereby, in the case of CD-ROMs on which a sequence of parts (or scenes) of a program are recorded, these CD-ROMs can be managed according to a result of recording the part (or scene) of the program. Consequently, in the case of this embodiment, even when the quantity of coded data varies largely according to the contents of image data coded by MPEG system, a plurality of CD-ROMs can be managed easily and reliably.

Incidentally, when finally updating the table in this way, the control circuit 11 further records the position information, which is necessary for accessing each file, according to a result of actually recording data. Thereby, the random access process or the like can be facilitated.

Figure 7:
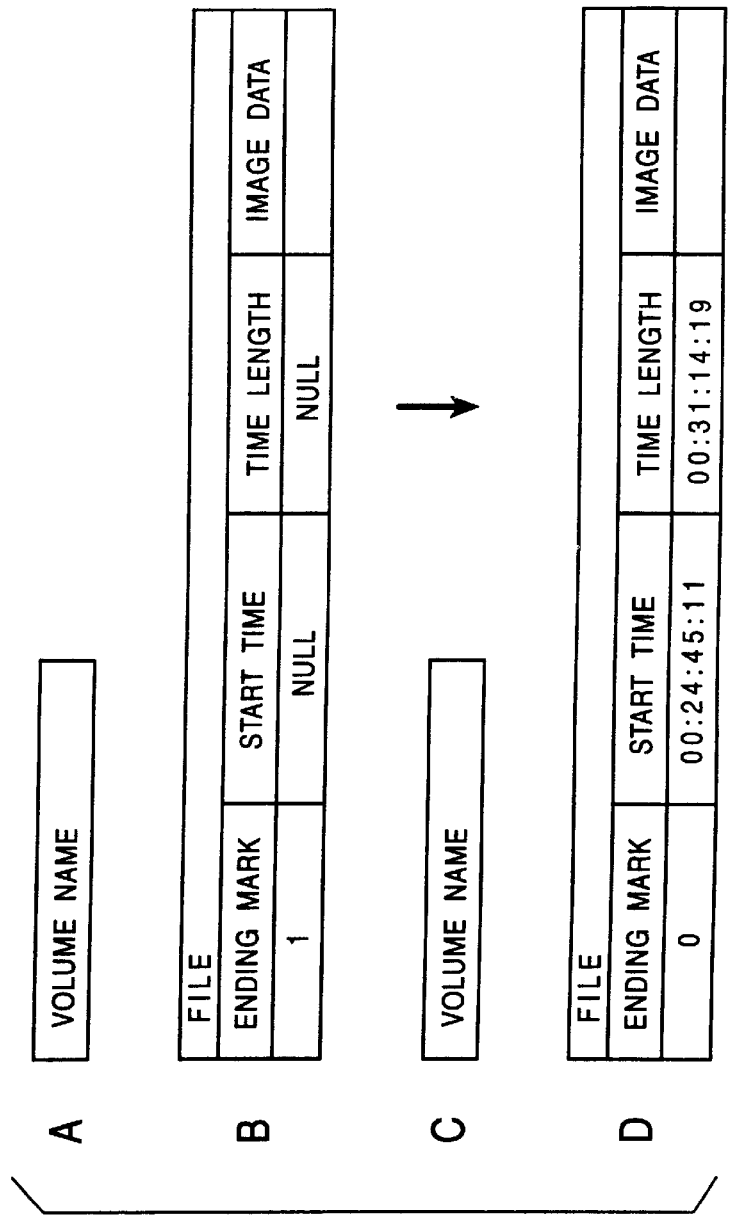
FIGS. 7(A) to 7(D) are diagrams for illustrating the recording of the files and so forth of FIGS. 3(A) to 3(F)

In contrast, as illustrated in FIGS. 7(A) to 7(D), the control circuit 11 preliminarily records the "ending mark" having a predetermined value, the "start time" having the estimated value, subsequent to the volume name (see FIG. 7(A)). Thereby, the control circuit 11 preliminarily secures a region for recording such data thereon. Subsequently, the control circuit 11 further records image data. When reaching the limit to the available capacity of CD-ROM, the control circuit 11 sets the "ending mark", the "start time" and so forth at correct values according to a result of recording the image data.

Namely, the control circuit 11 first sets the "ending mark" at the value of 1 which indicates that this CD-ROM is the last one. Then, each of the start time and the time length is set at NULL (as illustrated in FIG. 7(B)). After recording image data during being in this state, the control circuit 11 updates the "start time" and so forth recorded in the work memory 12 according to the result of recording and further sets the start time and the time length at a correct time and a correct time length, respectively (see FIG. 7(D)). Moreover, in the case of further recording image data on another CD-ROM, the control circuit 11 sets the "ending mark" at the value of 0. Thus, it is indicated by this value of the ending mask that there is a subsequent CD-ROM (see FIG. 7(C)).

Thereby, in the case of this embodiment, information representing actual start time and so of is recorded on each of CD-ROMs according to a result of the recording thereof. Consequently, CD-ROMs can be managed individually, easily and reliably.

When creating the table by recording image data in this way, the control circuit 11 controls an operation of the entire device in such a manner as to record image data corresponding to a predetermined time period on both of consecutive CD-ROMs repeatedly. Namely, when image data comes to be unable to be recorded on CD-ROM according to the position information outputted from the CD-ROM writing unit 2, the control circuit 11 issues a command to rewind a digital video tape recorder and then rewinds a part of magnetic tape, which corresponds to about two minutes simultaneously with the monitoring of the time code.

Thus, when recording image data on consecutive CD-ROMs, the control circuit 11 records same image data on both of consecutive CD-ROMs duplicately (or in an overlapping manner) for a time period of two minutes. Thereby, even in the case of recording image data by repeatedly performing the inter-frame coding and the intra-frame coding, a closed GOP flag can be fully set in each GOP only for two minutes at the beginning of the recording of the image data.

Therefore, in the case that (coded image) data recorded on the subsequent CD-ROM is reproduced and edited after reproducing the second (or latter) half of single CD-ROM, continuous image data can be correctly reproduced only by changing a result of decoding of the (coded) data according to the management data and by outputting the result of the decoding obtained by the changing. Thereby, a sequence of recorded image data extending over consecutive CD-ROMs can be correctly reproduced and decoded with a simple configuration. Consequently, a sense of incongruity can be effectively prevented from being caused by an image when an object to be reproduced is changed between the coded image data recorded in such a manner as to extend over consecutive CD-ROMs. Further, even in the case that an editing point is established on single CD-ROM, the image recorded on the precedent or subsequent CD-ROM can be partially identified (or verified), so that an editing operation can be simplified for that.

Thus, the control circuit 11 records a moment designated by the time code, which is at the midpoint of the region (or coded image data) duplicately recorded in this way, in the table as the suitable changing time (see FIGS. 4(B) and 4(D)). Thereby, when reproducing, the plurality of CD-ROMs can be simply managed by referring to this table so that an image, which does not cause a sense of incongruity, can be reproduced. Further, at that time, the control circuit 11 records a correct moment according to a result of the recording as the suitable changing time after a region for recording is first secured in accordance with the preliminarily estimated value. Consequently, even in the case that the data compression rate varies with the contents of image data largely, a correct time or moment can be recorded reliably.

Figure 8:
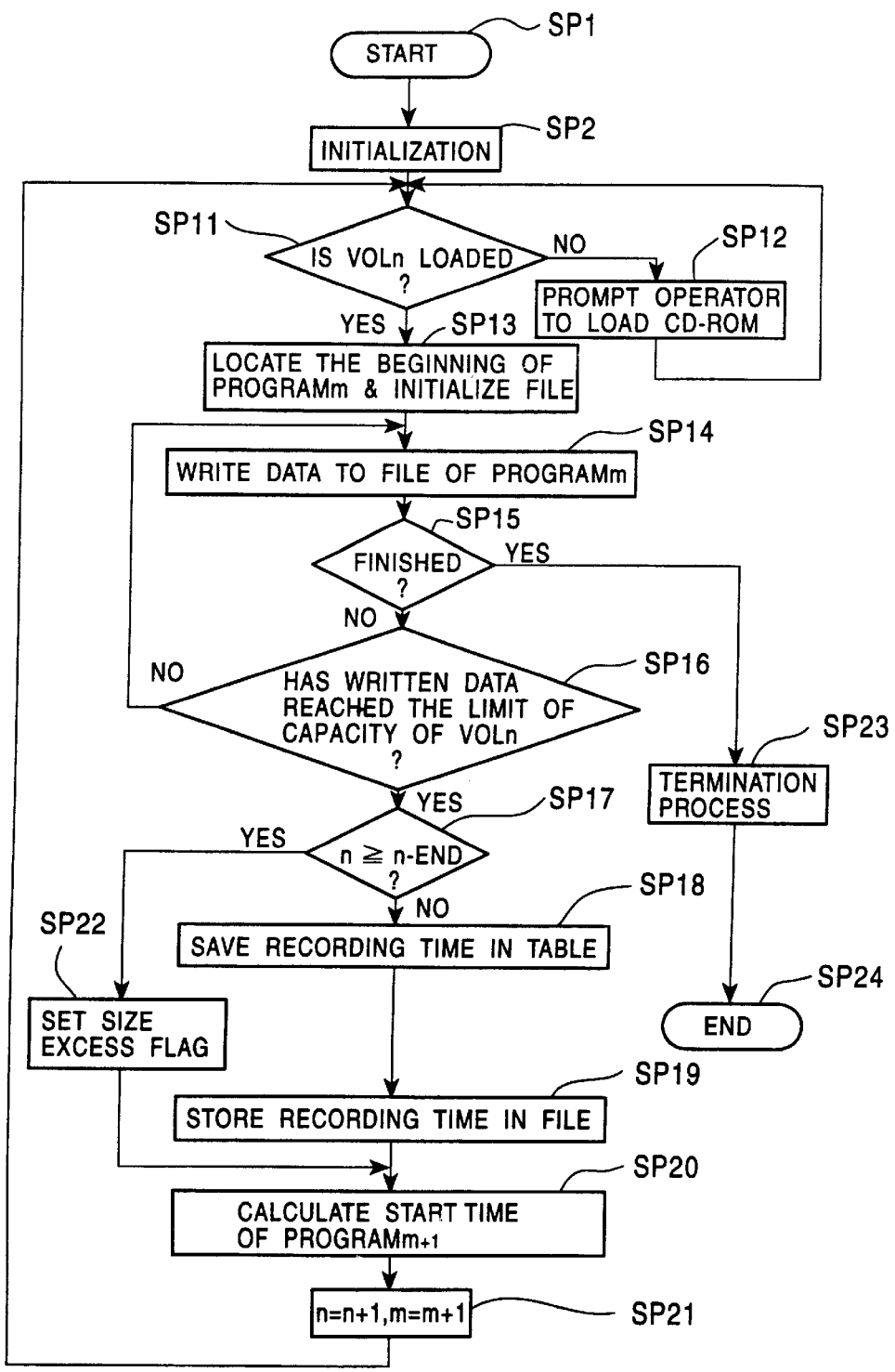
FIG. 8 is a flowchart for illustrating an operation of the image data processor of FIG. 1.

Thus, the control circuit 11 conducts such a sequence of operations by performing the procedure of FIG. 8. Namely, when an operator inputs a predetermined command after setting the digital video tape recorder and inputting information, which represents the name or title of a program, the name of the volume, the name of the file and the time length of the entire program through the input/output unit 13, the control circuit 11 advances to step SP2 from step SP1 whereupon the initialization process is performed.

Figure 9:
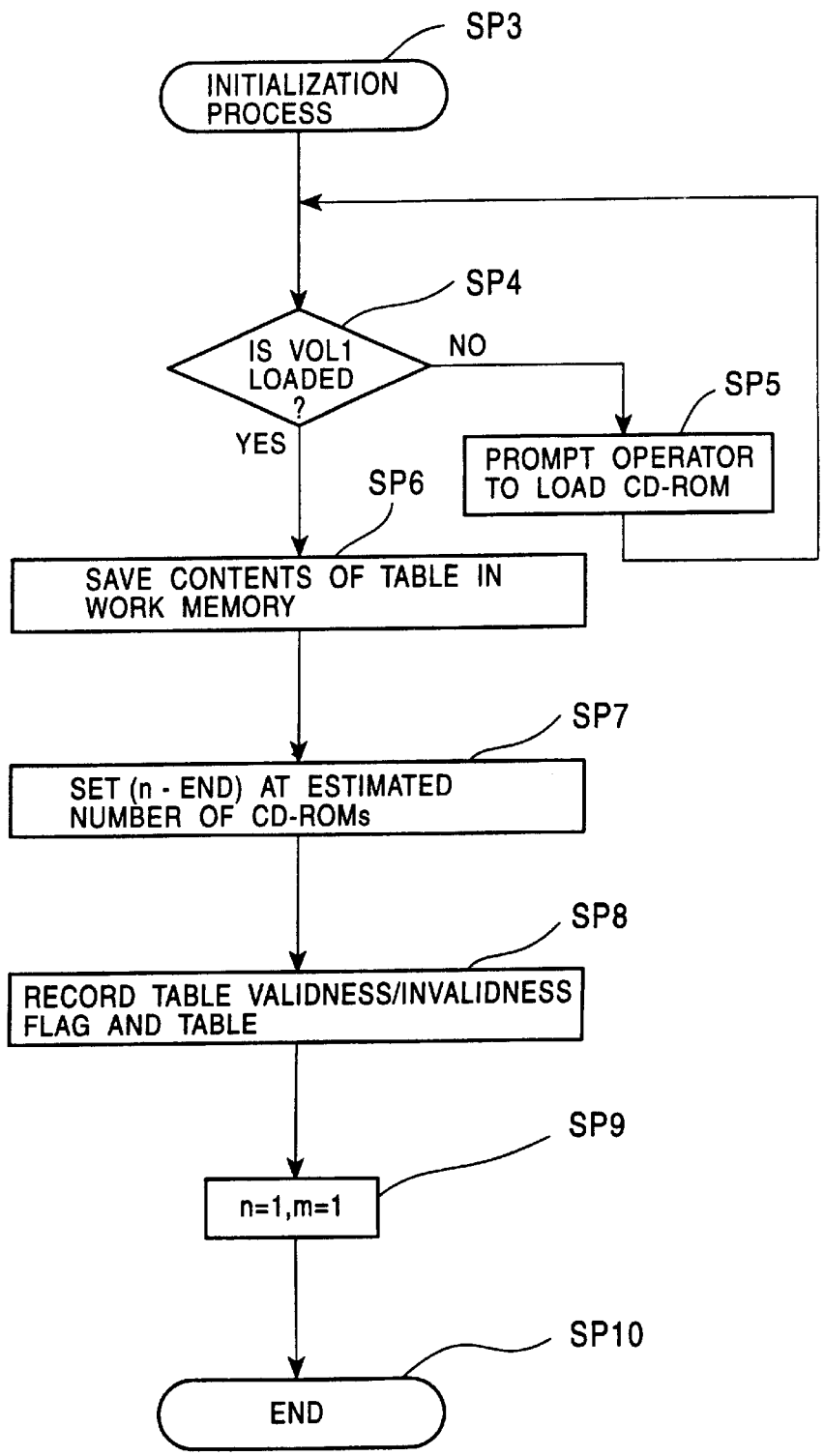
FIG. 9 is a flowchart for illustrating the initialization process of FIG. 8.

As illustrated in FIG. 9, in this initialization process, the control circuit 11 advances from step SP3 to step SP4 whereupon the circuit 11 issues a control command to the CD-ROM writing unit 2 and judges whether or not CD-ROM corresponding to VOL1 is loaded in the CD-ROM writing unit 2. If a negative result (namely, "NO") is obtained, the control circuit 11 further advances to step SP5 a message prompting the operator to load CD-ROM is displayed through the display of the input/output unit 13. Then, the control circuit 11 returns to step SP4.

In contrast, when CD-ROM has been loaded, the control circuit 11 is advanced from SP4 to step SP6 whereupon the table using the aforementioned preliminarily estimated value is built in the work memory 12. Subsequently, the control circuit 11 moves to step SP7 whereupon the preliminarily estimated number of CD-ROMs is recorded as the final value (n−END) of a variable "n". Then, the circuit 11 advances to step SP8.

In this step, the control circuit 11 issues a control command to the CD-ROM writing unit 2 so as to cause this unit to operate. The data such as the volume name, the time length of the program and the table validness/invalidness flag described hereinabove by referring to FIG. 2 are serially outputted through the SCSI interface 9. Thereby, the control circuit 11 records these data in an area subsequent to the lead-in area of CD-ROM. Subsequently, the control circuit 11 outputs the data of the table created in the work memory 12 to the CD-ROM writing unit 2 and further, records the table on this CD-ROM. Thereby, on CD-ROM, the control circuit 11 preliminarily secures an area for recording the table.

Next, the control circuit 11 advances to step SP9 whereupon the variables n and m are set at the value of 1. Thereafter, the control circuit 11 goes to step SP10. Thus, this initialization process is finished. Incidentally, this variable "n" designates the number of CD-ROMs, which is counted from the leading CD-ROM. Further, the variable "m" designates a numeral annexed to the program name.

Upon completion of the initialization process in this way, the control circuit 11 goes to step SP11 (of FIG. 8) whereupon it is judged whether or not CD-ROM having the volume name designated by the variable "n" is loaded in the CD-ROM writing unit 2. If the negative result (namely, "NO") is obtained, the circuit 11 advances to step SP12 whereupon this circuit prompts an operator to load CD-ROM, similarly as in step SP5. Thereafter, the circuit 11 returns to step SP11. In contrast, if an affirmative result (namely, "YES") is obtained in step SP11, the control circuit 11 advances to step SP13.

Here the control circuit 11 issues a control command to the digital video tape recorder and finds the beginning of a program preliminarily designated by the operator. Subsequently, the circuit 11 calculates data representing the start time and the time length to be recorded on CD-ROM. Incidentally, in the case of controlling the digital video tape recorder, the control circuit 11 locates the beginning of data recorded on magnetic tape in this digital video tape recorder on the basis of the time code recorded on the tape.

Subsequently, the control circuit 11 goes to step SP14 whereupon the data representing the start time and the time length calculated in step SP1 are serially sent to the CD-ROM writing unit 2 together with the data representing the ending mark. Then, the control circuit 11 starts reproducing the digital video signal DV. The data represented by this signal DV are sequentially encoded by the video encoder 3. Moreover, resultant coded data DF is outputted to the CD-ROM writing unit 2 according to the MPEG format together with other data representing motion vectors or the like.

The control circuit 11 monitors the time code outputted from the digital video tape recorder and judges whether or not the program is finished, in the subsequent step SP15. If a negative result (namely, "NO") is obtained, the control circuit 11 advances to step SP16 whereupon the circuit 11 monitors the position information concerning the writing position obtained from the CD-ROM writing unit 2 and judges whether or not the quantity of data, which can be recorded on CD-ROM, becomes not more than the predetermined quantity (for example, 100 Kbytes). Thereby, the control circuit 11 judges whether not the quantity of the recorded data reaches the limit to the available capacity of this CD-ROM. If a negative result (namely, "NO") is obtained, the circuit 11 returns to step SP14.

Thus, the control circuit 11 repeats the procedures constituted by a loop consisting of steps SP14-SP15-SP16-SP14, so that the digital video signal DV is recorded on CD-ROM. If the image data cannot be written to CD-ROM by recording the digital video signal DV in this way, an affirmative result (namely, "YES") is obtained in step SP16. Thus, the control circuit 11 exits to step SP17.

Here, the control circuit 11 judges whether or not the variable "n" reaches the final value (n−END) thereof. Thereby, the control circuit 11 judges whether or not the number of used CD-ROMs reaches the initially estimated value. If the negative result (namely, "NO"), the circuit 11 advances to step SP18 whereupon the control circuit 11 updates the data representing the start time, the finish time, the time length and the suitable changing time of the table, which is created in the work memory 12, according to the time recorded on CD-ROM. Incidentally, these kinds of time data are determined by a continuous time starting since the moment, at which the recording of data on the first or leading CD-ROM is commenced, differently from the time code of the digital video signal DV.

Subsequently, the control circuit 11 advances to step SP19 whereupon the ending mark, the start time and the time length are newly recorded again (namely, rewritten) on a region preliminarily secured on CD-ROM. Thereby, the control circuit 11 newly records (namely, rewrites) the ending mark, the start time and the time length at the beginning of each file according to a result of the actual recording. Thereafter, the control circuit 11 goes forward to step SP20.

In this step SP20, the control circuit 11 calculates the start time corresponding to the next CD-ROM. Then, the control circuit 11 advances to step SP21 whereupon the variables "n" and "m" are incremented. Subsequently, the control circuit 11 returns to step SP11. Thereby, the control circuit 11 waits for the loading of the next CD-ROM in the CD-ROM writing unit 2. If loaded therein, the control circuit 11 secures an area for recording the ending mark, the start time and the time length. Thereafter, the circuit 11 locates the beginning of the tape in the digital video tape recorder and records the digital video signal DV thereon. At that time, the control circuit 11 rewinds the magnetic tape and finds the beginning the data recorded thereon so that the image data of two minutes is recorded duplicately in such a way as to extend over consecutive CD-ROMs.

Consequently, the control circuit 11 records a sequence of image data on this subsequent CD-ROM. In the case that the intended program is not completely recorded on this CD-ROM yet, the negative result (namely, "NO") is obtained again in step SP16. Thus, after the procedure constituted by steps SP17-SP18-SP19-SP20-SP21 is performed, the control circuit 11 returns to step SP11. Thereafter, the circuit 11 records image data on the next CD-ROM.

In contrast, in the case that the recording of the intended program is not completed by using the preliminarily estimated number of CD-ROMs, the affirmative result (namely, "YES") is obtained in step SP16. Then, the affirmative result (namely, "YES") is further obtained in the subsequent step SP17. Thus, the control circuit 11 advances to step SP22 whereupon the control circuit 11 sets the table validness/invalidness flag corresponding to the table created in the work memory 12 at the value designating the size exceeding flag. Thereafter, the control circuit 11 goes to step SP20.

Thereby, in the image data processor 1, in the case that the recording of the digital video signal DV is not completed by using the preliminarily estimated number of CD-ROMs, the size exceeding flag is set and thereafter, the procedure starting from step SP11 is repeated. Thus, if exceeds the preliminarily estimated number of CD-ROMs, the digital video signal DV is recorded by prompting an operator to change CD-ROM if necessary, until the recording of the intended program is completed.

Upon completion of the recording of the intended program by continuing the recording of the digital video signal DV in this way, the affirmative result (namely, "YES") is obtained in step SP15, so that the control circuit 11 advances to step SP23 whereupon the termination process is performed. Then, the control circuit 11 further moves to step SP24 whereupon this termination process is completed.

Figure 10:
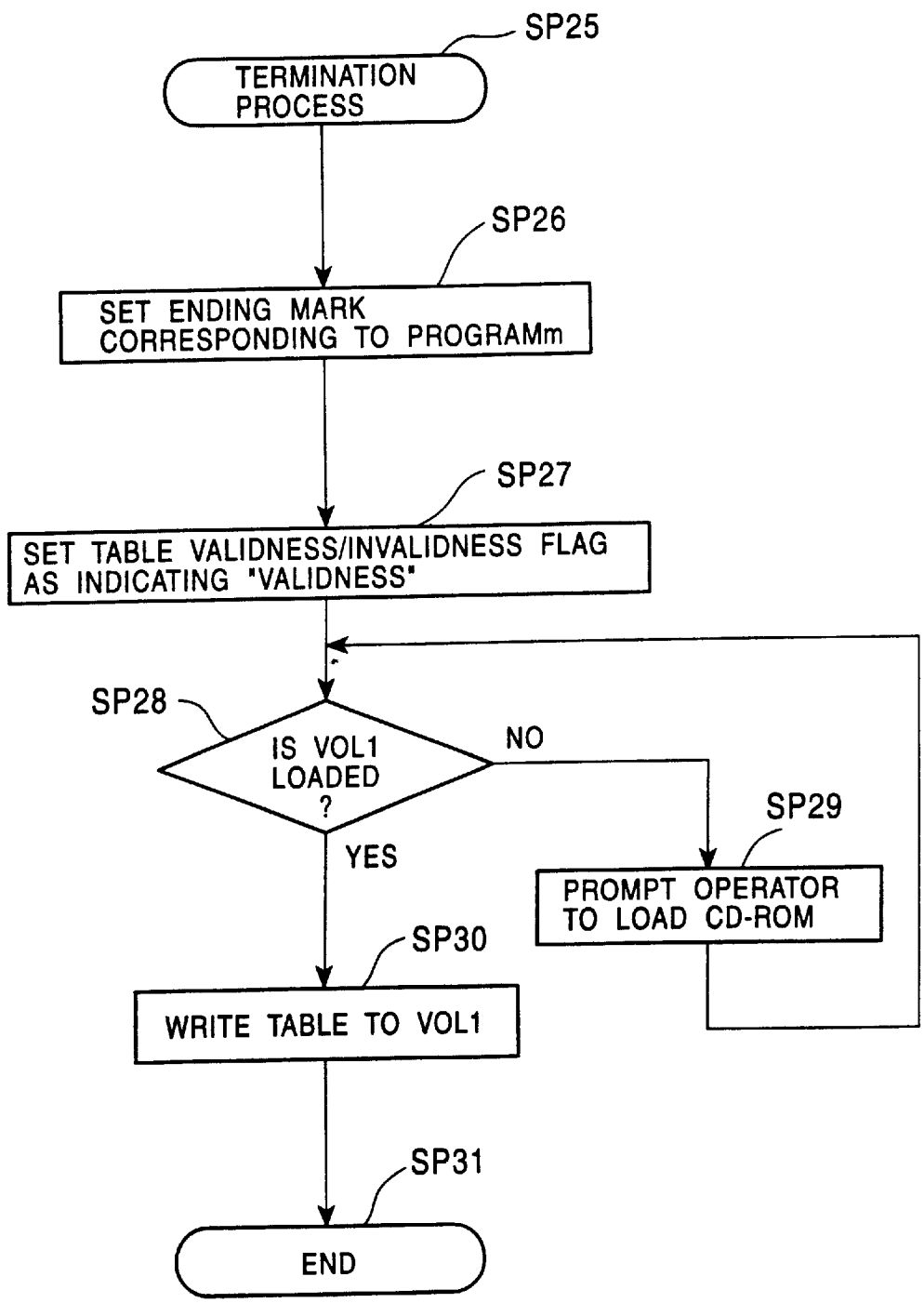
FIG. 10 is a flowchart for illustrating the termination process of FIG. 10.

As illustrated in FIG. 10, in the termination process, the control circuit 11 advances from step SP25 to step SP26 whereupon the ending mark corresponding to the last CD-ROM is set at the value of 1 and this ending mark, the start time and the time length are newly recorded again (namely, rewritten) on the preliminarily secured region of CD-ROM.

Subsequently, the control circuit 11 advances to step SP27 whereupon the start time, the finish time and the time length of the corresponding file of the table created in the work memory 12 are updated according to the times recorded on CD-ROM. At that time, in the case that the size exceeding flag is not set, the control circuit 11 sets the table validness/invalidness flag at the value designating the validness.

Next, the control circuit 11 goes to step SP28 whereupon it is judged whether or not the first or leading CD-ROM (namely, the CD-ROM VOL1) is loaded. If the negative result (namely, "NO") is obtained, the control circuit 11 advances to step SP29 whereupon this circuit prompts an operator to load this CD-ROM. Thereafter, the control circuit 11 returns to step SP27. Thereby, the control circuit 11 waits for the loading the first or leading CD-ROM by a user. When this CD-ROM is loaded, the control circuit 11 moves from step SP28 to step SP29 whereupon the table created in the work memory 12 is newly recorded again (namely, rewritten) on this CD-ROM. Then, the control circuit 11 advances to step SP31. Consequently, this procedure is completed.

(2) Playback of Image Data

Figure 11:
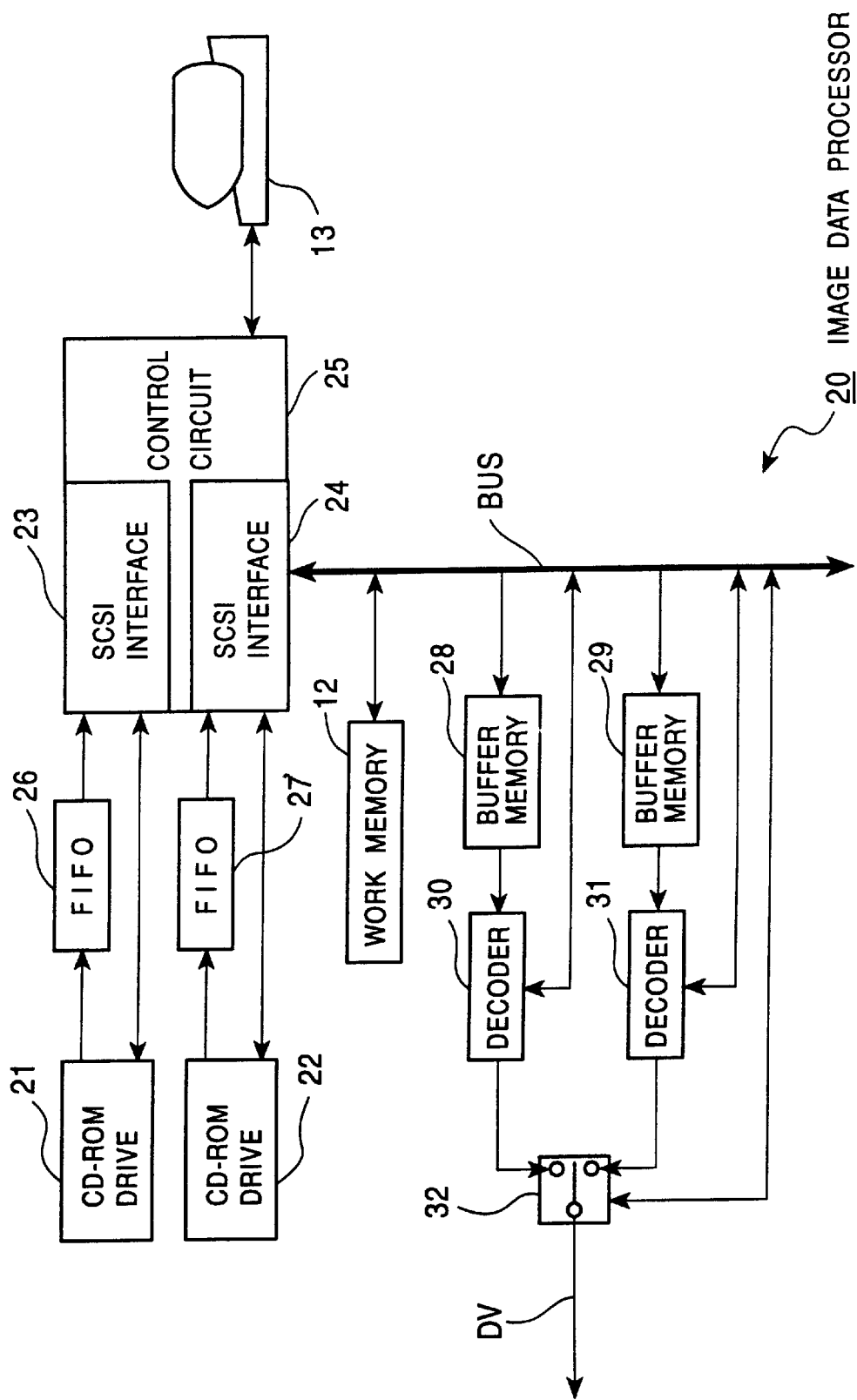
FIG. 11 is a schematic block diagram for illustrating the configuration of another embodiment of the present invention, namely, an image data processor for reproducing image data, which embodies the present invention.

FIG. 11 is a block diagram illustrating the configuration of an image data processor 20 for reproducing image data recorded in the aforementioned way on CD-ROM and for reproducing image data recorded on CD-ROM produced by using another CD-ROM, which is made in the aforementioned manner, as a master (disk). Incidentally, in FIG. 11, like reference characters designate like composing elements of FIG. 1. Thus, the description of such composing elements is omitted herein for simplicity of description.

Namely, this image data processor 20 has two CD-ROM drives 21 and 22. Operations of these CD-ROM drives 21 and 22 are changed in response to control commands inputted from a control circuit 25 through SCSI interfaces 23 and 24, respectively. Moreover, these CD-ROM drives 21 and 22 are operative to reproduce image data recorded on CD-ROMs and to output resultant playback (or reproduced) data of MPEG format to the control circuit 25 through FIFO memories 26 and 27, respectively.

The buffer memories 28 and 29 are operative to temporarily hold playback data inputted through a bus BUS and to output the playback data to decoders 30 and 31, respectively. At that time, the buffer memories 28 and 29 selectively input and output playback data corresponding to CD-ROM drives 21 and 22 from playback data outputted to the bus BUS.

The decoders 30 and 31 convert serially inputted playback data into digital video signals and output the digital video signals, in contrast with the video encoder 3 (of FIG. 1). Thus, each of the decoders 30 and 31 has composing elements respectively corresponding to the information-source encoder 4, the video signal multiplexing encoder 6 and the encoding control 5 of the video encoder 3. Thereby, these decoders decode the digital video signals DV recorded on each of CD-ROMs loaded in the CD-ROM drives 21 and 22.

These decoders 30 and 31 changes operations thereof in response to control commands issued from the control circuit 25 through the bus BUS. A selection circuit 32 is similarly controlled by the control circuit 25 through the bus BUS and is operative to selectively output digital video signals having been outputted from the decoders 30 and 31.

Figure 12:
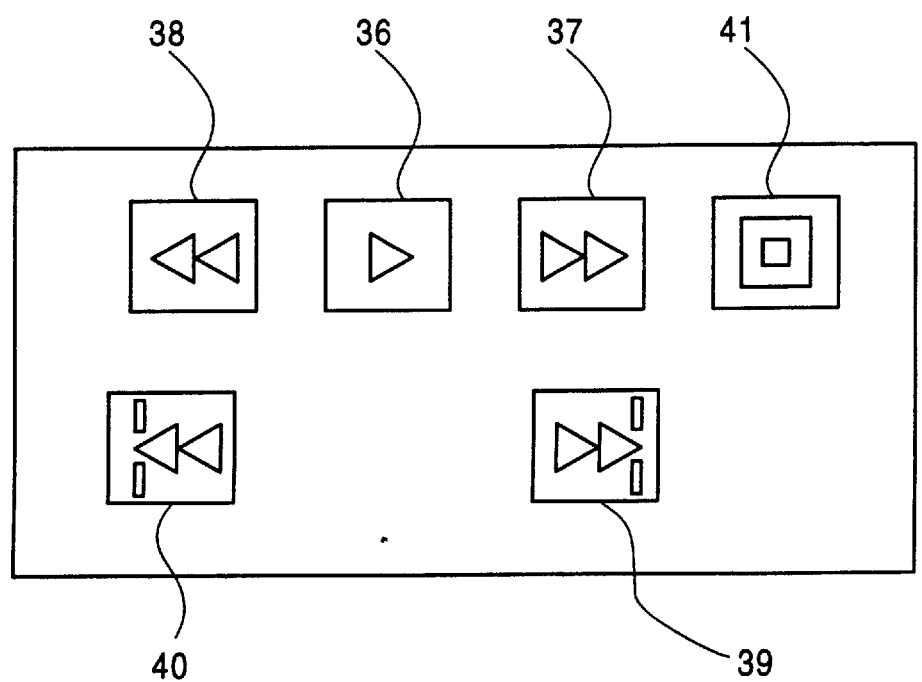
FIG. 12 is a diagram for illustrating icons (or ikons) used in the image data processor of FIG. 11.

The control circuit 25 is constituted by a microcomputer for controlling an operation of the entire image data processor 20. In the case of this embodiment, icons 36 to 41 of FIG. 12 are displayed on the screen of the display of the input/output unit 13. Further, when an operator clicks these icons 36 to 41 by using a mouse, the operation thereof is changed correspondingly to the clicked icon.

Incidentally, the icon 36 designates an ordinary playback operation; the icons 37 and 38 denote forward and reverse fast playback operations, respectively; and the icon 41 designates an operation of halting or stopping a playback operation.

Figure 13:
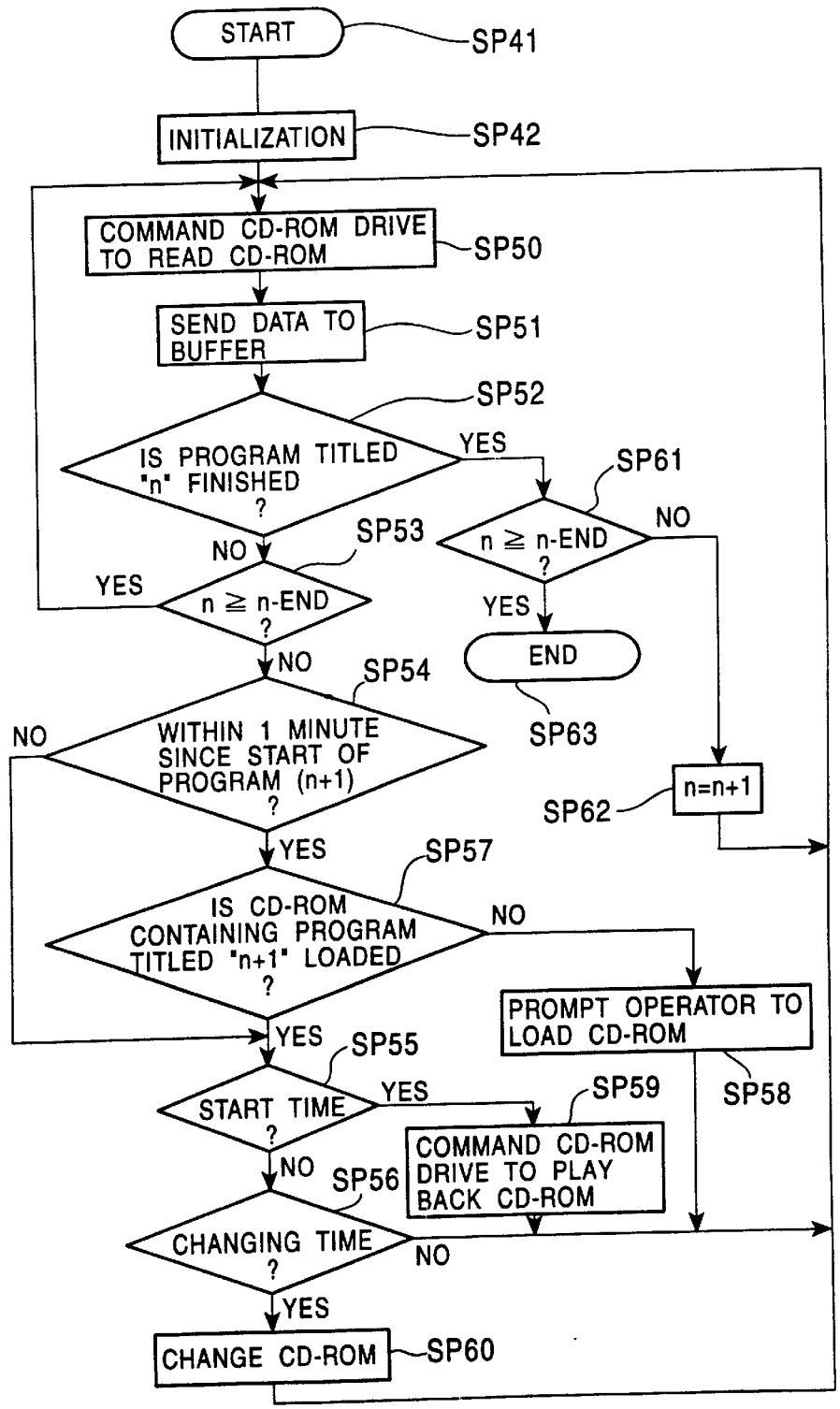
FIG. 13 is a flowchart for illustrating an operation of the image data processor of FIG. 11.

When a mode, in which CD-ROMs are reproduced from the first or leading CD-ROM, is selected and the ordinary playback operation is selected from these operations by clicking the icon 36, the control circuit 25 performs the procedure of FIG. 13. Thereby, the data recorded on CD-ROMs are reproduced. Namely, the control circuit 25 advances from step SP41 to step SP42 whereupon the initialization process is performed. Incidentally, the procedure of FIG. 13 is an example thereof in the case that the table validness/invalidness flag is effectively set.

Figure 14:
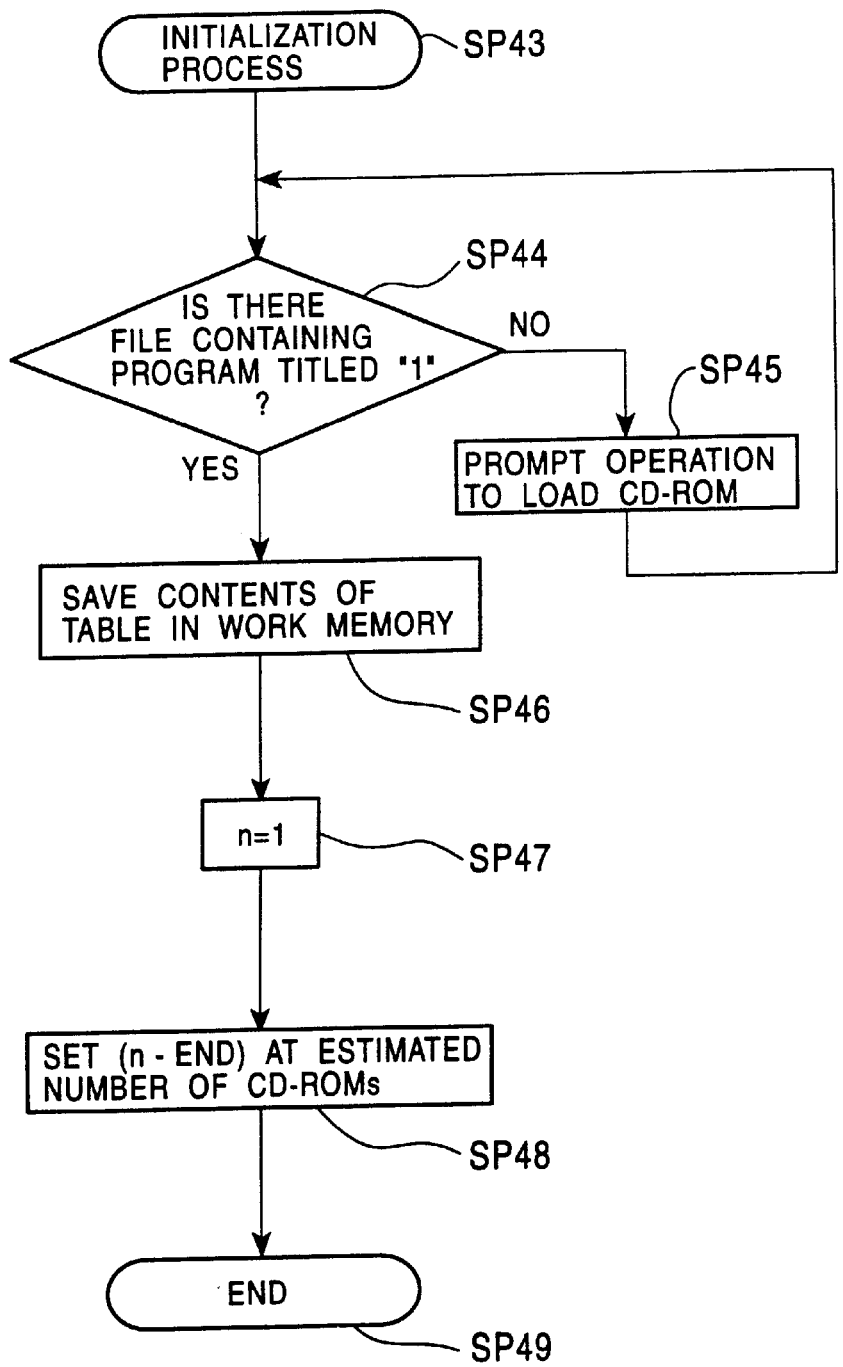
FIG. 14 is a flowchart for illustrating the initialization process of FIG. 13.

As illustrated in FIG. 14, in this initialization process, the control circuit 25 advances from step SP43 to step SP44 whereupon control commands are issued through the SCSI interfaces 23 and 24 to the CD-ROM drives 21 and 22 and it is judged whether CD-ROM corresponding to VOL1 is loaded in the CB-ROM drive 21 or 22. Here, if the negative result (namely, "NO") is obtained, the control circuit 25 advances to step SP45 whereupon a message prompting an operator to load CD-ROM is displayed through the input/output unit 13. Thereafter, the control circuit 25 returns to step SP44.

In contrast, in the case that CD-ROM corresponding to "VOL1" is loaded therein, the control circuit 25 advances from step SP44 to step SP46 whereupon control commands are issued to the CD-ROM drive 21 or 22 and further, the data listed in the table is reproduced from the first or leading CD-ROM and then, this table is created in the work memory 12.

Subsequently, the control circuit 25 advances to step SP47 whereupon the variable "n" representing the number of CD-ROMs is set at the value of 1. Then, the control circuit 25 further advances to step SP48 whereupon the variable "n" is set at the final value (n–END) from this table. Next, the control circuit 25 advances to step SP49 whereupon this initialization process is finished. Thereby, the control circuit 25 loads the management table, which is recorded on the first or leading CD-ROM, in the work memory 12. Further, the control circuit 25 performs the subsequent playback operation according to the table created in this work memory 12.

Namely, the control circuit 25 then advances to step SP50 whereupon a playback command is issued to the CD-ROM drive 21 or 22 in which this first or leading CD-ROM is loaded, and the playback of this CD-ROM is started. Moreover, the control circuit 25 subsequently advances to step SP51 whereupon a decoding operation is started by issuing a control command to the corresponding decoder 30 or 31, and the contact (point) of the selection circuit 32 is changed to the decoder 30 or 31, and moreover, serially obtained playback data are transferred to the decoder 30 or 31 through the buffer memory 28 or 29.

Thereby, the control circuit 25 sequentially reproduces digital video signals DV from this first or leading CD-ROM. Then, the control circuit 25 moves to the subsequent step SP53 whereupon the control circuit 25 judges whether or not the variable "n" matches the final value (n–END), and thus the circuit 25 judges whether the currently reproduced CD-ROM is the last CD-ROM. If the negative result (namely, "NO") is obtained, the control circuit 25 goes to step SP54 whereupon the a current playback time is detected from the time information reproduced from CD-ROM as a sub-code. Moreover, the control circuit 25 judges whether or not the current playback time is 1 minute before the start time of the subsequent CD-ROM, which is stored in the work memory 12.

Here, if the negative result (namely, "NO") is obtained, the control circuit 25 goes to step SP55 whereupon the control circuit 25 judges whether or not the current playback time matches the start time of the subsequent CD-ROM, which is stored in the work memory 12. If the negative result (namely, "NO") is further obtained in this step, the control circuit 25 advances to step SP56 whereupon the control circuit 25 similarly judges whether or not the current playback time matches the suitable changing time. If the negative result (namely, "NO") is obtained in this step, the control circuit 25 returns to step SP50.

Thereby, the control circuit 25 iteratively performs the procedure, which is constituted by a loop consisting of serial steps SP50-SP51-SP52-SP53-SP54-SP55-SP56-SP50, on the first CD-ROM and reproduces the digital video signals DV recorded on this CD-ROM and outputs the reproduced signals.

When performing the playback operation consisting of these steps in sequence repeatedly in this way, the data recorded in the first CD-ROM are serially reproduced in the CD-ROM drive 21 or 22 in which this CD-ROM is loaded. Thus, the current playback time gradually comes nearer to the start time of the subsequent CD-ROM. In this case, when the current playback time matches 1 minute before the start time of the subsequent CD-ROM, the affirmative result (namely, "YES") is obtained in the control circuit 25. Thus, the control circuit 25 advances to step SP57.

Here, the control circuit 25 judges whether or not the subsequent CD-ROM is loaded in the other CD-ROM drive 22 or 21. If the affirmative result (namely, "YES") is obtained, the control circuit 25 goes to step SP55. In contrast, if the negative result (namely, "NO") is obtained, the control circuit 25 advances to step SP58 whereupon a message prompting an operator or user to load the subsequent CD-ROM in the other CD-ROM drive 22 or 21 is displayed through the input/output unit 13. Thereafter, the control circuit 50 returns to step SP50.

Thereby, the control circuit 25 iteratively performs the procedure, which is constituted by a loop consisting of steps SP50-SP51-SP52-SP53-SP54-SP57-SP58-SP50 and keeps displaying the message, which prompts the operator to load the subsequent CD-ROM, until the operator loads the subsequent CD-ROM in the other CD-ROM 22 or 21. Incidentally, in the case that the operator does not load this CD-ROM in spite of the displaying such a message, the current playback time exceeds the suitable changing time in the CD-ROM drive 21 or 22. Consequently, the control circuit 25 detects this time and performs another predetermined procedure. Thus, the control circuit 25 ceases performing the playback operation.

In contrast, in the case that the operator loads the subsequent CD-ROM therein, the control circuit 25 iteratively performs the procedure, which is constituted by a loop consisting of steps SP50-SP51-SP52-SP53-SP54-SP57-SP55-SP56-SP50. Thereafter, the current playback time reaches the start time of the subsequent CD-ROM. In this case, the affirmative result (namely, "YES") is obtained in step SP55, so that the control circuit 25 goes to step SP59 whereupon a command to start the playback of data recorded on the subsequent CD-ROM is issued and activates the decoder 30 or 31 which has halted. Thereafter, the control circuit 25 returns to step SP50.

Thereby, when it becomes the start time of the subsequent CD-ROM, the control circuit 25 issues a control command to reproduce the data recorded on the first or leading CD-ROM and the data recorded on the subsequent CD-ROM concurrently (or simultaneously) in parallel. Subsequently, the control circuit 25 iteratively performs the procedure, which is constituted by a loop consisting of steps SP50-SP51-SP52-SP53-SP54-SP57-SP55-SP56-SP50.

At that time, the control circuit 25 operates two playback systems in synchronization with each other on the basis of the time information obtained from the first (or leading) CD-ROM and the subsequent CD-ROM in such a manner that the image data recorded duplicately on both of these two CD-ROMs are reproduced at the same time.

Even in the case that the image data is recorded by iteratively performing the inter-frame coding and the intra-frame coding, if the image data recorded duplicately on both of these CD-ROMs in this manner is reproduced concurrently in parallel, the data recorded on these CD-ROMs are reproduced concurrently in parallel for a minute or so. Thus the data recorded on these CD-ROMs can be decoded reliably in such a way that there is substantially no difference between the image data obtained by decoding the data recorded on the (first or leading) CD-ROM, which has been reproduced heretofore, and the image data obtained by decoding the data recorded on the subsequent CD-ROM, the reproduction of which has been just started.

Thus, the control circuit 25 iteratively performs the procedure, which is constituted by a loop consisting of steps SP50-SP51-SP52-SP53-SP54-SP57-SP55-SP56-SP50. Thereafter, when the current playback time reaches the suitable changing time of the subsequent CD-ROM, the affirmative result (namely, "YES") is obtained in step SP56, so that the control circuit 25 goes to step SP60 whereupon the control circuit 25 performs a control switching operation on the selection circuit 32. Further, the control circuit 25 issues to the CD-ROM device 21 or 22 a command to halt or a command to eject CD-ROM. Then., the control circuit 25 returns to step SP50.

Thereby, the control circuit 25 changes or switches the object, which should be reproduced, from the first or leading CD-ROM to the subsequent CD-ROM. At that time, the control circuit 25 operates the two CD-ROM drives 21 and 22 in synchronization with each other by effectively utilizing a duplication period of 1 minute. Thereafter, the image, which is recorded on both of the two CD-ROMs in such a manner as to extend over these CD-ROMs, can be reproduced by changing the position of the contact of the selection circuit 32 without causing a sense of incongruity.

When returning to step SP50 after changing the object to the subsequent CD-ROM, the control circuit 25 performs the procedure consisting of steps SP50 and SP51. Then, in the nest step SP52, the negative result (namely, "NO") can be obtained because of the fact that the playback operation of the data recorded on the first (or leading) CD-ROM has been already completed. Thereby, the control circuit 25 advances from step SP52 to step SP61 whereupon the circuit 25 judges whether or not the variable "n" matches the final value (n–END), and thus judges whether or not the playback operation of the data recorded on the last CD-ROM has been already completed. In this case, the negative result (namely, "NO") is obtained as above described, so that the control circuit 25 further advances from step SP61 to SP62 whereupon the variable "n" is incremented in such a manner as to deal with the subsequent CD-ROM having the data, the reproduction of which has been just started. Subsequently, the control circuit 25 returns to step SP50.

Thus, the control circuit 25 similarly performs the aforementioned sequence of procedures on CD-ROMs which follow the two CD-ROMs. Thereby, the digital video signals DV recorded on the plurality of CD-ROMs by being split across CD-ROMs can be reproduced sequentially and the reproduced signals are then outputted.

In the case that the sequence of procedures are iteratively performed on the last CD-ROM in this way, the affirmative result (namely, "YES") is obtained by the control circuit 25 in step SP53 because NULL is recorded as the file name of the (subsequent) file stored in the work memory 12. Thus, the control circuit 25 iteratively performs the procedure, which is constituted by a loop consisting of steps SP50-SP51-SP53-SP50, until the playback of the data recorded on this CD-ROM is completed.

Furthermore, upon completion of the playback of the data recorded on this CD-ROM, the affirmative result (namely, "YES") is obtained in step SP52. Thus the control circuit 25 advances to step SP61 whereupon the variable "n" matches the final value (n–END) and thus the affirmative result (namely, "YES") is obtained. Then, the control circuit 25 further advances to step SP63 whereupon this sequence of procedures is finished.

Further, in the case that the size exceeding flag is set, the control circuit 25 sets the final value (n–END) of the variable "n" at a value larger than the size of the table. Moreover, the control circuit 25 repeatedly performs the aforementioned procedure of FIG. 13. Thus the control circuit 25 changes the operation of the device according to the management data recorded in this table within the confine or range predetermined by the table. However, beyond the confine predetermined by the table, the control circuit 25 relegates the change of operations to an operator.

In contrast, when the other playback icons 37 to 40 are clicked, the control circuit 25 issues control commands similarly. Further, in the case that the table is not loaded in the work memory 12, a message prompting an operator to load the first (or leading) CD-ROM is displayed and then the table is loaded from this first CD-ROM in the work memory 12. Moreover, an operation of the entire device is changed in such a manner as to respond to the icon clicked according to this table.

At that time, in the case that the size exceeding flag has been set, the control circuit 25 causes the display (unit) to display the manageable range according to the time length of the entire program and the finish time corresponding to the last file recorded in the table. Further, the control circuit 25 performs the operations such as a random accessing operation on this range. In this case, if necessary, a message prompting an operator to load CD-ROM is displayed.

Thereby, in the case of this image data processor, operations such as an editing operation can be simplified on the basis of this management data. Especially, in the case of this kind of editing operations, it is often that editing points composed of inner points or the like are searched for at a high speed and are then established. In such a case, an operation of reproducing and checking portions precedent and subsequent to the editing points is performed. In this case, a CD-ROM stores image data, which are also recorded on the precedent and subsequent CD-ROMs, in this embodiment. Thus, even in the case that image data can be edited by using only a single CD-ROM, this embodiment can easily perform such a checking operation. Consequently, the efficiency in such a checking operation can be enhanced.

(3) Operation of Embodiments

In the aforementioned configurations, digital video signals DV (of FIG. 1) serially inputted at the time of recording image data are converted into coded data DF in the format prescribed by MPEG standards and are inputted to the CD-ROM writing unit 2 through the bus BUS together with data such as a motion vector. Thereby, the coded data DF is recorded on CD-ROM in accordance with the format of CD-ROM.

When recording the data, the control circuit 11 preliminarily estimates the number of CD-ROMs required to record the data from the time length of the program to be recorded and from the standard recording time during which the data can be recorded onto single CD-ROM. Further, tables, each of which contain the volume name, the file names, the start time, the finish time, the time length and the suitable changing time of a corresponding CD-ROM, are created by the control circuit 11 in the work memory 12 in such a way that the number of the tables is equal to the estimated number of necessary CD-ROMs.

Furthermore, in the first (or leading) CD-ROM, the volume name, the time length of the entire program, the table validness/invalidness flag are recorded in the leading recording area subsequent to the lead-in area thereof. Next, the table created in the work memory is further recorded therein according to the estimated value. Subsequently, the file consisting of the ending mark, the start time, the time length and the image data is recorded therein in addition thereto.

This image data is written to CD-ROM loaded in the CD-ROM writing unit 2 until it becomes difficult to further record image data on this single CD-ROM. Further, the remaining image data is written to each of other CD-ROMs until it becomes difficult to further record the image data on each of these CD-ROMs. At that time, in each of the latter (subsequent) CD-ROMS, the file consisting of the volume name, the ending mark, the start time, the time length and the image data is recorded.

Further, the coded data DF is recorded so that the image data of two minutes is recorded duplicately in such a way as to extend over consecutive CD-ROMs. Thereby, in the CD-ROM, continuous image data can be reproduced from consecutive CD-ROMs without causing a sense of incongruity by utilizing a simple configuration by which results of decoding are simply switched. Consequently, the editing operation or the like can be simplified.

Thus, when recording an intended program, the start time and the finish time and so on of the table created in the work memory 12 according to the preliminarily estimated value are rewritten (namely, corrected) according to a result of recording. Upon completion of recording of the program, the table corresponding to the first CD-ROM and the corresponding table validness/invalidness flag are updated. Thereby, in CD-ROM, a correct table based on the result of recording is recorded in the preliminarily secured region on which the table base on the preliminarily estimated is recorded. Moreover, management data for managing a plurality of CD-ROM is recorded thereon.

Thereby, based on this management data recorded in this CD-ROM, a plurality of CD-ROMs can be managed when reproducing the data. Therefore, degradation in the picture quality, which would be caused by forcibly recording the image data on single CD-ROM, can be effectively prevented by recording image data split across the plurality of CD-ROMs to facilitate an random access operation and so on.

Furthermore, in each of such CD-ROMs, a leading region is preliminarily secured and further, the time information based on the preliminarily estimated value is recorded in the leading region. Thereafter, correct time information is recorded therein according to a result of the recording. Consequently, the easiness in using each of such CD-ROMs solely can be enhanced.

(4) Advantages of Embodiments

With the foregoing configuration, even when image data is coded according to MPEG system, by which the quantity of data varies with the contents of the data largely, and is recorded, a plurality of CD-ROMs can be managed easily and reliably by splitting coded data across the plurality of CD-ROMs and recording the coded data in such a way as to extend over the plurality of CD-ROMs. Therefore, image data corresponding to a long time period can be recorded on CD-ROMs without recording the image data on single CD-ROM forcibly. Consequently, mass data can be recorded thereon by effectively preventing the picture quality from being degraded.

Moreover, the image data is recorded on CD-ROM so that this image data partially overlaps with image data respectively recorded on precedent and subsequent CD-ROMs. Thus, when reproducing image data encoded by repeatedly performing the inter-frame coding and the intra-frame coding, image data causing no sense of incongruity can be obtained by utilizing a simple configuration by which results of decoding the overlapping portions of the image data are simply switched. Consequently, the editing operation or the like can be simplified.

(5) Other Embodiments

In the aforesaid embodiment, a region required to record a table therein is preliminarily secured by recording the table based on the prediction therein. The present invention, however, is not limited to such a case. For example, an area on which no data is recorded may be secured in such a manner as to correspond to the table based on the prediction. Further, a table may be recorded on such an area according to a result of the recording of the data.

Moreover, in the case of the aforesaid embodiments, the encoding operation is performed by iteratively performing the inter-frame coding and the intra-frame coding. The present invention, however, is not limited to this case. For instance, the recording of image data recorded on CD-ROM in such a manner as to partly overlap with image data recorded on each of precedent and subsequent CD-ROMs may be omitted in the case that the encoding operation is carried out by performing only the intra-frame coding, and in the case that the encoding operation is carried out by performing the intra-frame coding only for a predetermined time period since the recording of data on the subsequent recording medium is started.

Furthermore, in the aforementioned embodiments, the suitable changing time is recorded in addition to the start time as data for managing CD-ROMs. The present invention, however, is not limited to such an embodiment. In short, the essential point is that time information for managing a plurality of recording sub-media or information recording surfaces thereof is recorded on CD-ROM. For example, the recording of the time length may be omitted because the time length corresponding to each file can be calculated from the start time and the finish time. Moreover, if the time period, during a part of the image data is recorded duplicately on both of consecutive CD-ROMs, is predetermined as having constant time length, the suitable changing time, the start time and the finish time may be further omitted.

Additionally, in the aforementioned embodiments, image data is recorded by using a single CD-ROM writing unit. Further, the image data is reproduced by using two CD-ROM drives (or drive units). The present invention, however, is not limited to such embodiments. The present invention can be widely applied to various cases, for example, the case that the image data is recorded by using a plurality of CD-ROM writing units, the case that the image data is reproduced by using a single CD-ROM drive or using three or more CD-ROM drives, and the case that the image data is recorded and reproduced by changing CD-ROMs by means of an automatic changer.

Furthermore, in the aforesaid embodiments, the image data is recorded on and is reproduced from CD-ROMs.

In addition, even in the case that audio or sound signal is recorded solely, the present invention can be widely applied to the coding system by which the quantity of data largely varies with the contents of audio or sound data.

Beside, in the case of the aforesaid embodiments, the digital video signals of NTSC system are recorded and reproduced. The present invention, however, is not limited to such a case. The present invention can be widely applied to various cases, for instance, the digital video signals of PAL (Phase Alteration by Line) system or SECAM (Sequentiele Couleu a Memoire) system are recorded and reproduced.

Further, in the aforementioned embodiments, CD-ROM is used as a recording medium. The recording medium of the present invention, however, is not limited thereto. The present invention can be widely applied to various cases, for example, the case that data is recorded on disk-like recording media such as a magneto-optic disk, a floppy disk and a hard disk. Moreover, in such cases, the present invention can be applied to the case that a sequence of data is split across both surfaces of a disk-like recording medium or is divided in such a manner as to extend over a plurality of information recording surface portions on one of the top and bottom surfaces of a recording medium.

Furthermore, in the case of the aforesaid embodiments, the data compression ratio varies largely with the contents of data and thus a result of the recording of data cannot be predicted correctly. The application of the present invention, however, is not limited to such a case. Namely, the present invention can be widely applied to various cases, for instance, the case that the recording capacity of a recording medium cannot be known and thus a result of the recording of data cannot be predicted correctly, and the case that the quantity of data cannot be known correctly and thus a result of the recording of data cannot be predicted correctly.

As above described, in accordance with the present invention, even when the quantity of coded data varies with the contents thereof largely, mass data can be split across and thus recorded in such a manner as to extend over a plurality of recording media or the like and moreover, the plurality of recording media or the like can be managed easily and reliably by recording management data on a leading region of a recording medium or the like preliminarily secured by prediction. Thereby, for example, the picture quality of images represented by image data can be effectively prevented from being degraded. Moreover, mass image data can be recorded.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A data reproducing device for reproducing from a recording medium data coded by a predetermined coding process, comprising:

reproducing means for reproducing coded data from a plurality of information recording surfaces on at least one recording medium;

decoding means for decoding the coded data and for outputting decoded data; and control means for controlling said reproducing means to reproduce said coded data from a first surface of said plurality of information recording surfaces in accordance with second management data recorded on said first surface, and for controlling said reproducing means to switch to a second surface of said plurality of information recording surfaces in accordance with first management data recorded on said first surface, wherein said control means is further configured to control said reproducing means to reproduce said coded data from said second surface in accordance with another second management data recorded on said second surface;

wherein said first management data is not recorded on said second surface and used for managing all of said plurality of surfaces, and said second management data is used for managing a corresponding one of said plurality of surfaces.

2. The data reproducing device of claim 1, wherein the data, which is obtained by the decoding means by performing the decoding and is further outputted therefrom, is image data, wherein said at least one recording medium is at least one optical disk, and wherein the coding method is a method of allocating a variable-length code to at least one coefficient data, obtained by performing an orthogonal transform on the image data, according to values of the coefficient data.

3. The data reproducing device of claim 1, wherein said reproducing means comprises:

a plurality of CD-ROM drives.

4. A data reproducing device for reproducing from a recording medium data coded by a predetermined coding process, comprising:

at least one drive device configured to reproduce coded data from a plurality of information recording surfaces on at least one recording medium;

a decoding circuit configured to decode the coded data and configured to output decoded data; and a control circuit configured to control said at least one drive device to reproduce said coded data from a first surface of said plurality of information recording surfaces in accordance with second management data recorded on said first surface, and to control said at least one drive device to switch to a second surface of said plurality of information recording surfaces in accordance with first management data recorded on said first surface, wherein said control circuit is further configured to control said at least one drive device to reproduce said coded data from said second surface in accordance with another second management data recorded on said second surface;

wherein said first management data is used for managing all of said plurality of surfaces, and said second management data is used for managing a corresponding one of said plurality of surfaces.

5. A method of reproducing from a recording medium data coded by a predetermined coding process, comprising the steps of:

reading first management data from a first surface of a plurality of information recording surfaces of at least one recording medium;

reading second management data from said first surface;

reproducing coded data from said first surface in accordance with said second management data;

decoding said coded data and in accordance therewith generating output data;

changing to a second surface of said plurality of surfaces in accordance with said first management data;

reading another second management data from said second surface;

reproducing more coded data from said second surface according to said another second management data; and decoding said more coded data and in accordance therewith generating more output data; and wherein said first management data is not recorded on said second surface and used for managing all of said plurality of surfaces, and said second management data is used for managing a corresponding one of said plurality of surfaces.

6. A recording medium, in which coded data obtained by encoding data according to a predetermined coding method is recorded, operative to control, in part, operation of a reproduction device, said recording medium comprising a plurality of information recording surfaces on at least one recording medium, said recording medium having recorded thereon:

first management data used for managing all of said plurality of information recording surfaces recorded only on a first of said plurality of information recording surfaces, said first management data having been generated upon completion of recording said coded data;

a plurality of second management data, each of said plurality of second management data recorded on a corresponding one of said plurality of information recording surfaces and used for managing said corresponding one of said plurality of information recording surfaces;

an overlapping portion of said coded data on one surface of said plurality of information recording surfaces; and a duplicate of said overlapping portion on another surface of said plurality of information recording surfaces, wherein the reproduction device reproduces the coded data from the first surface of the plurality of information recording surfaces based on the second management data recorded on the first surface and switches to a second surface of the plurality of information recording surfaces based on the first management data recorded on the first surface.

7. The data recording medium of claim 6, wherein said first management data is recorded according to a result of recording the coded data on said at least one recording medium after securing a first management region corresponding to a quantity of the surfaces, which is preliminarily estimated, when predicting a difficulty to record the coded data on a single one of the surfaces.

8. The data recording medium of claim 7, wherein the coded data is image data, wherein said at least one recording medium is at least one optical disk, and wherein the coding method is a method of allocating a variable-length code to at least one coefficient data, obtained by performing an orthogonal transform on the image data, according to values of the coefficient data.

9. The data recording medium of claim 6, wherein said plurality of second management data is recorded on the surfaces according to a result of recording.

10. A plurality of recording media, on which coded data obtained by encoding data according to a predetermined coding method is recorded, operative to control, in part, operation of a reproduction device, said plurality of recording media having recorded thereon:

first management data used for managing all of said plurality of recording media recorded on a first medium of said plurality of recording media, said first management data having been generated upon completion of recording said coded data;

a plurality of second management data, each of said plurality of second management data recorded on a corresponding one of said plurality of recording media and used for managing said corresponding one of said plurality of recording media;

an overlapping portion of said coded data on one medium of said plurality of recording media; and a duplicate of said overlapping portion on another medium of said plurality of recording media, wherein the reproduction device reproduces the coded data from the first medium of the plurality of recording media based on the second management data recorded on the first medium and switches to a second medium of the plurality of recording media based on the first management data recorded on the first medium.

11. The plurality of recording media of claim 10, wherein said first management data is recorded according to a result of recording the coded data on said plurality of recording media after securing a first management region corresponding to a quantity of said plurality of recording media, which is preliminarily estimated, when predicting a difficulty to record the coded data on a single one of said plurality of recording media.

12. The plurality of recording media of claim 11, wherein the coded data is image data, wherein said plurality of recording media is a plurality of optical disks, and wherein the coding method is a method of allocating a variable-length code to at least one coefficient data, obtained by performing an orthogonal transform on the image data, according to values of the coefficient data.

13. The plurality of recording media of claim 10, wherein said plurality of second management data is recorded on said plurality of recording media according to a result of recording.

* * * * *